United States Patent
Hao et al.

(10) Patent No.: US 12,088,383 B2
(45) Date of Patent: Sep. 10, 2024

(54) UPLINK SRS WITH PRECODING

(71) Applicant: QUALCOMM Incorporated, San Diego, CA (US)

(72) Inventors: Chenxi Hao, Beijing (CN); Yu Zhang, Beijing (CN); Bo Chen, Beijing (CN); Ruifeng Ma, Beijing (CN); Pavan Kumar Vitthaladevuni, San Diego, CA (US); Wanshi Chen, San Diego, CA (US); Qiaoyu Li, Beijing (CN); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/276,765

(22) PCT Filed: Oct. 16, 2018

(86) PCT No.: PCT/CN2018/110502
§ 371 (c)(1),
(2) Date: Mar. 16, 2021

(87) PCT Pub. No.: WO2020/077536
PCT Pub. Date: Apr. 23, 2020

(65) Prior Publication Data
US 2021/0351827 A1 Nov. 11, 2021

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0456* (2013.01); *H04L 5/0051* (2013.01); *H04L 25/0226* (2013.01)

(58) Field of Classification Search
CPC ............... H04B 7/0404; H04B 7/0456; H04B 7/0639; H04L 5/0048; H04L 5/005; H04L 5/0051; H04L 25/0226
See application file for complete search history.

(56) References Cited

U.S. PATENT DOCUMENTS 8,917,687 B2 * 12/2014 Shi .................. H04L 5/0023
370/332
9,503,231 B2 * 11/2016 Gaal .................... H04L 5/0048
(Continued)

FOREIGN PATENT DOCUMENTS

CN 102170330 A 8/2011
CN 104350689 A 2/2015
(Continued)

OTHER PUBLICATIONS

Lenovo et al., Maintenance for non-codebook based UL transmission, Oct. 8, 2018, 3GPP TSG RAN WG1 Meeting #94bis, Chengdu, China, Agenda Item: 7.1.2.1, Tdoc: R1-1810570 (Year: 2018).*
(Continued)

*Primary Examiner* — Eric Nowlin
(74) *Attorney, Agent, or Firm* — Patterson & Sheridan LLP

(57) ABSTRACT

Certain aspects of the present disclosure provide techniques for uplink sounding reference signal (SRS) transmission with precoding. A method for wireless communication by a user equipment (UE) includes receiving a SRS configuration that configures one or more SRS resource sets, each resource set including one or more SRS resources, each SRS resource comprising one or more SRS ports. The UE receives a set of precoders via an indicator, the set of precoders including a precoder associated with each SRS resource and determines one or more precoders to apply for one or more SRS transmissions via one or more of the SRS resources.

28 Claims, 23 Drawing Sheets

(51) Int. Cl.
*H04L 5/00* (2006.01)
*H04L 25/02* (2006.01)

(56) References Cited

U.S. PATENT DOCUMENTS

| | | | |
|---|---|---|---|
| 9,596,065 | B2 | 3/2017 | Chen et al. |
| 9,680,542 | B2* | 6/2017 | Zhu ................ H04L 25/03942 |
| 10,735,072 | B2* | 8/2020 | Kwak ................ H04B 7/0456 |
| 10,742,303 | B1* | 8/2020 | Nilsson ................ H04B 7/063 |
| 10,763,943 | B2* | 9/2020 | Liu ................ H04W 72/563 |
| 10,764,007 | B2* | 9/2020 | Zhao ................ H04L 5/0048 |
| 10,819,407 | B2* | 10/2020 | Park ................ H04B 7/0486 |
| 10,819,408 | B2* | 10/2020 | Park ................ H04B 7/065 |
| 10,980,053 | B2* | 4/2021 | Li ................ H04W 72/21 |
| 11,025,388 | B2* | 6/2021 | Liu ................ H04L 5/0048 |
| 11,101,953 | B2* | 8/2021 | Lee ................ H04B 7/0486 |
| 11,115,960 | B2* | 9/2021 | Goto ................ H04L 1/1887 |
| 11,140,687 | B2* | 10/2021 | Manolakos ....... H04W 72/0446 |
| 11,233,676 | B2* | 1/2022 | Zhang ................ H04B 7/0456 |
| 11,296,760 | B2* | 4/2022 | Park ................ H04B 7/065 |
| 11,483,180 | B2* | 10/2022 | Li ................ H04B 7/0404 |
| 11,588,601 | B2* | 2/2023 | Liu ................ H04B 7/0456 |
| 11,711,812 | B2* | 7/2023 | Wang ................ H04L 5/0092 370/330 |
| 2012/0106373 | A1 | 5/2012 | Gaal et al. |
| 2012/0113869 | A1* | 5/2012 | Gaal ................ H04L 5/0048 370/255 |
| 2013/0039319 | A1* | 2/2013 | Shi ................ H04L 27/26132 370/328 |
| 2013/0107746 | A1* | 5/2013 | Wang ................ H04L 25/03343 370/252 |
| 2016/0277081 | A1 | 9/2016 | Wei et al. |
| 2016/0329942 | A1* | 11/2016 | Zhu ................ H04L 25/03898 |
| 2017/0048039 | A1* | 2/2017 | Zhao ................ H04L 25/0226 |
| 2017/0331535 | A1 | 11/2017 | Wei et al. |
| 2018/0227101 | A1* | 8/2018 | Park ................ H04L 5/0091 |
| 2018/0227103 | A1 | 8/2018 | Wang et al. |
| 2018/0262242 | A1* | 9/2018 | Chakraborty ........ H04B 7/0665 |
| 2018/0287682 | A1* | 10/2018 | Kwak ................ H04L 5/0057 |
| 2018/0367205 | A1* | 12/2018 | Liu ................ H04B 7/0486 |
| 2019/0109679 | A1* | 4/2019 | Liu ................ H04B 7/0404 |
| 2019/0173607 | A1* | 6/2019 | Liu ................ H04L 5/0044 |
| 2019/0379501 | A1* | 12/2019 | Park ................ H04W 16/28 |
| 2020/0067663 | A1* | 2/2020 | Liu ................ H04W 72/1268 |
| 2020/0107304 | A1* | 4/2020 | Wang ................ H04L 5/0092 |
| 2020/0112970 | A1* | 4/2020 | Manolakos ......... H04L 25/0226 |
| 2020/0153576 | A1* | 5/2020 | Lee ................ H04W 72/04 |
| 2020/0162133 | A1* | 5/2020 | Harrison ............. H04W 52/248 |
| 2020/0186303 | A1* | 6/2020 | Hao ................ H04B 7/0626 |
| 2020/0204243 | A1* | 6/2020 | Liu ................ H04W 72/563 |
| 2020/0204406 | A1* | 6/2020 | Zhang ................ H04W 80/08 |
| 2020/0235802 | A1* | 7/2020 | Nilsson .............. H04L 25/0226 |
| 2020/0336264 | A1* | 10/2020 | Faxér ................ H04B 7/0617 |
| 2020/0366344 | A1* | 11/2020 | Davydov ............. H04L 5/0007 |
| 2020/0383089 | A1* | 12/2020 | Goto ................ H04W 72/04 |
| 2020/0403669 | A1* | 12/2020 | Park ................ H04L 5/0051 |
| 2021/0281448 | A1* | 9/2021 | Li ................ H04L 5/0051 |
| 2021/0297993 | A1* | 9/2021 | Yuan ................ H04W 72/21 |
| 2021/0306123 | A1* | 9/2021 | Gao ................ H04L 27/2605 |
| 2021/0336737 | A1* | 10/2021 | Li ................ H04L 5/0094 |
| 2023/0057080 | A1* | 2/2023 | Khoshnevisan ..... H04B 7/0695 |
| 2023/0208588 | A1* | 6/2023 | Hao ................ H04W 72/231 370/329 |
| 2023/0254085 | A1* | 8/2023 | Liu ................ H04W 72/23 370/329 |

FOREIGN PATENT DOCUMENTS

| | | | | |
|---|---|---|---|---|
| CN | 108111268 | A | | 6/2018 |
| CN | 108111272 | A | | 6/2018 |
| CN | 114430314 | A | * | 5/2022 ........... H04B 7/0404 |
| EP | 3692665 | B1 | * | 12/2022 ........... H04B 7/0404 |
| EP | 4149044 | A1 | * | 3/2023 ........... H04B 7/0404 |
| KR | 20200066682 | A | * | 6/2020 |
| RU | 2730892 | C1 | * | 8/2020 ........... H04B 7/0404 |
| WO | WO-2011131127 | A1 | * | 10/2011 ........ H04L 27/2613 |
| WO | 2014065850 | A1 | | 5/2014 |
| WO | WO-2015096083 | A1 | * | 7/2015 ........... H04B 7/0417 |
| WO | WO-2018228189 | A1 | * | 12/2018 ........... H04B 7/0486 |
| WO | WO-2018231141 | A1 | * | 12/2018 ........... H04B 7/0404 |

OTHER PUBLICATIONS

Intel Corporation, Offline Discussion Summary on Codebook Based UL Transmission, Feb. 26, 2018, 3GPP TSG RAN WG1 Meeting #92, Athens, Greece, Tdoc: R1-1803321 (Year: 2018).*

Nokia et al., Summary of issues on UL non-codebook based transmission, Oct. 8, 2018, 3GPP TSG RAN WG1 Meeting #94bis, Chengdu, China, Agenda Item: 7.1.2.1, Tdoc: R1-1811840 (Year: 2018).*

3GPP TS 38.214: "3rd Generation Partnership Project, Technical Specification Group Radio Access Network, NR, Physical Layer Procedures for Data (Release 15)", V1.0.0 (Sep. 2017), pp. 1-32, Sections 5.2, 6.2.1.

International Search Report and Written Opinion—PCT/CN2018/110502—ISA/EPO—Apr. 28, 2019.

3GPP TS 38.214, "3rd Generation Partnership Project, Technical Specification Group Radio Access Network, NR, Physical Layer Procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophiaanti Polis Cedex, France, vol. RAN WG1, No. V15.0.0, Dec. 2017, Jan. 3, 2018 (Jan. 3, 2018), XP051392264, pp. 1-71, [retrieved on Jan. 3, 2018], Chapters 6.1.1.1 and 6.1.2.1.

"3rd Generation Partnership Project, Technical Specification Group Radio Access Network, NR, Physical Channels and Modulation (Release 15)", 3GPP Standard, Technical Specification, 3GPP TS 38.211, 3rd Generation Partnership Project (3GPP), Mobile Competence Centre 650, Route Des Lucioles, F-06921 Sophia-Antipolis Cedex, France, vol. RAN WG1, No. V15.0.0, Jan. 3, 2018 (Jan. 3, 2018), XP051392260, pp. 1-73, [retrieved on Jan. 3, 2018] Chapter 6.4.1.4.1.

Intel Corporation: "Summary of Codebook Based UL Transmission", 3GPP Draft, 3GPP TSG RAN WG1 Meeting #92bis, R1-1805664 Summary of Codebook Based UL Transmission_R4, 3rd Generation Partnership Project (3GPP), Mobile Competence Centre, 650, Route Des Lucioles, F-06921 Sophia-Antipolis Cedex, Fra, vol. RAN WG1, No. Sanya, China, Apr. 16, 2018-Apr. 20, 2018 Apr. 19, 2018 (Apr. 19, 2018), XP051427790, pp. 1-12, Retrieved from the Internet: URL: http://www.3gpp.org/ftp/Meetings%5F3GPP%5FSYNC/RAN1/Docs/ Chapters 2.1 and 2.5.

Interdigital Inc: "Remaining Details on Non-CB based UL Transmission", 3GPP Draft, 3GPP TSG RAN WG1 Meeting AH 1801, R1-1800627_Remaining Details on Non-CB Based UL Transmission, 3rd Generation Partnership Project (3GPP), Mobile Competence Centre, 650, Route Des Lucioles, F-06921 Sophia-Antipolis Cedex, vol. RAN WG1, No. Vancouver, Canada, Jan. 22, 2018-Jan. 26, 2018 Jan. 13, 2018, XP051384957, 4 Pages, URL: http://www.3gpp.org/ftp/tsg%5Fran/WG1%5FRL1/TSGR1%5FAH/NR%5FAH%5F1801/Docs/ p. 1.

Supplementary European Search Report—EP18937501—Search Authority—Munich—May 11, 2022.

Vivo: "Remaining on SRS design", 3GPP Draft, 3GPP TSG RAN WG1 Meeting #92, R1-1801527_Remaining Issues on SRS, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 15, 2018 (Feb. 15, 2018), XP051396779, 4 Pages, Retrieved from the Internet: URL: http://www.3gpp.org/ftp/tsg%5Fran/WG1%5FRL1/TSGR1%5F92/Docs/, [retrieved on Feb. 15, 2018], Sections 1, 2.1, Chapter 2.1.

ZTE, et al., "Remaining Details on Codebook Based UL Transmission", 3GPP Draft, 3GPP TSG RAN WG1 Meeting #92, R1-1801577 Remaining Details on Codebook Based UL Transmission, 3rd Generation Partnership Project (3GPP), Mobile Competence Centre, 650, Route Des Lucioles, F-06921 Sophia-Antipolis Ced, vol.

(56) References Cited

OTHER PUBLICATIONS

RAN WG1, No. Athens, Greece, Feb. 26, 2018-Mar. 2, 2018 Feb. 16, 2018 (Feb. 16, 2018), XP051396945, 4 Pages, Retrieved from the Internet: URL: http://www.3gpp.org/ftp/tsg%5Fran/WG1%5FRL1/TSGR1%5F92/Docs/ Chapters 2 and 3.

* cited by examiner

SRS resource 1 w/ 2 ports:
Sounding the DL channels related to Rx component 0 and 1

SRS resource 2 w/ 2 ports:
Sounding the DL channels related to Rx component 0 and 1

Table 6.3.1.5-1: Precoding matrix $W$ for single-layer transmission using two antenna ports.

| TPMI index | $W$ (ordered from left to right in increasing order of TPMI index) | | | | | |
|---|---|---|---|---|---|---|
| 0 – 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

FIG. 15

Table 6.3.1.5-2: Precoding matrix $W$ for single-layer transmission using four antenna ports with transform precoding enabled.

| TPMI index | $W$ (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | – | – | – | – |

FIG. 16

Table 6.3.1.5-3: Precoding matrix $W$ for single-layer transmission using four antenna ports with transform precoding disabled.

| TPMI index | $W$ (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | | | | |

FIG. 17

Table 6.3.1.5-4: Precoding matrix $W$ for two-layer transmission using two antenna ports with transform precoding disabled.

| TPMI index | $W$ (ordered from left to right in increasing order of TPMI index) | | |
|---|---|---|---|
| 0 – 2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

FIG. 18

Table 6.3.1.5-5: Precoding matrix $\overline{W}$ for two-layer transmission using four antenna ports with transform precoding disabled.

| TPMI index | $\overline{W}$ (ordered from left to right in increasing order of TPMI index) | | | |
|---|---|---|---|---|
| 0 – 3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4 – 7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8 – 11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12 – 15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16 – 19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20 – 21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | – | – |

FIG. 19

Table 6.3.1.5.4-6: Precoding matrix $W$ for three-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2\sqrt{3}}\begin{bmatrix} 1 & 0 & 0 \\ 0 & 1 & 0 \\ 0 & 0 & 1 \\ 0 & 0 & 0 \end{bmatrix}$ | $\frac{1}{2\sqrt{3}}\begin{bmatrix} 1 & 0 & 0 \\ 0 & 1 & 0 \\ 1 & 0 & 0 \\ 0 & 0 & 1 \end{bmatrix}$ | $\frac{1}{2\sqrt{3}}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 – 6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & 1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | |

FIG. 20

Table 6.3.1.5-7: Precoding matrix $W$ for four-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | | | |

FIG. 21

UPLINK SRS WITH PRECODING

CROSS-REFERENCE TO RELATED APPLICATIONS

This application is a national stage application under 35 U.S.C. 371 of PCT/CN2018/110502, filed Oct. 16, 2018, which is incorporated herein by reference in its entirety.

INTRODUCTION

Field of the Disclosure

Aspects of the present disclosure relate to wireless communications, and more particularly, to techniques for providing precoders for uplink sound reference signals (SRS).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes configuring a user equipment (UE) with a sounding reference signal (SRS) configuration that configures one or more SRS resource sets, each resource set including one or more SRS resources, each SRS resource comprising one or more SRS ports. The method generally includes providing the UE with a set of precoders via an indicator, the set of precoders including a precoder associated with each SRS resource.

Certain aspects provide a method for wireless communication by a UE. The method generally includes receiving a SRS configuration that configures one or more SRS resource sets, each resource set including one or more SRS resources, each SRS resource comprising one or more SRS ports. The method generally includes receiving a set of precoders via an indicator, the set of precoders including a precoder associated with each SRS resource and determining one or more precoders to apply for one or more SRS transmissions via one or more of the SRS resources.

Certain aspects provide an apparatus for wireless communication. The apparatus generally includes means for configuring a UE with a SRS configuration that configures one or more SRS resource sets, each resource set including one or more SRS resources, each SRS resource comprising one or more SRS ports. The apparatus generally includes means for providing the UE with a set of precoders via an indicator, the set of precoders including a precoder associated with each SRS resource.

Certain aspects provide an apparatus for wireless communication. The apparatus generally includes means for receiving a SRS configuration that configures one or more SRS resource sets, each resource set including one or more SRS resources, each SRS resource comprising one or more SRS ports. The apparatus generally includes means for receiving a set of precoders via an indicator, the set of precoders including a precoder associated with each SRS resource and means for determining one or more precoders to apply for one or more SRS transmissions via one or more of the SRS resources.

Certain aspects provide an apparatus for wireless communication. The apparatus generally includes at least one processor coupled with a memory and configured to configure a UE with a SRS configuration that configures one or more SRS resource sets, each resource set including one or more SRS resources, each SRS resource comprising one or more SRS ports. The at least one processor is configured to provide the UE with a set of precoders via an indicator, the set of precoders including a precoder associated with each SRS resource.

Certain aspects provide an apparatus for wireless communication. The apparatus generally includes a receiver configured to receive a SRS configuration that configures one or more SRS resource sets, each resource set including one or more SRS resources, each SRS resource comprising one or more SRS ports. The receiver is configured to receive a set of precoders via an indicator, the set of precoders including a precoder associated with each SRS resource. The apparatus generally includes at least one processor coupled with a memory and configured to determine one or more precoders to apply for one or more SRS transmissions via one or more of the SRS resources.

Certain aspects provide a computer readable medium having computer executable code stored thereon for wireless communication. The computer executable code generally includes code for configuring a UE with a SRS configuration that configures one or more SRS resource sets, each resource set including one or more SRS resources, each SRS resource comprising one or more SRS ports. The computer executable code generally includes code for providing the UE with a set of precoders via an indicator, the set of precoders including a precoder associated with each SRS resource.

Certain aspects provide a computer readable medium having computer executable code stored thereon for wireless communication. The computer executable code generally includes code for receiving a SRS configuration that configures one or more SRS resource sets, each resource set including one or more SRS resources, each SRS resource comprising one or more SRS ports. The computer executable code generally includes code for receiving a set of precoders via an indicator, the set of precoders including a precoder associated with each SRS resource and code for determining one or more precoders to apply for one or more SRS transmissions via one or more of the SRS resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 15-21 illustrate example transmission precoding matrix indicators (TPMI) used for PUSCH, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
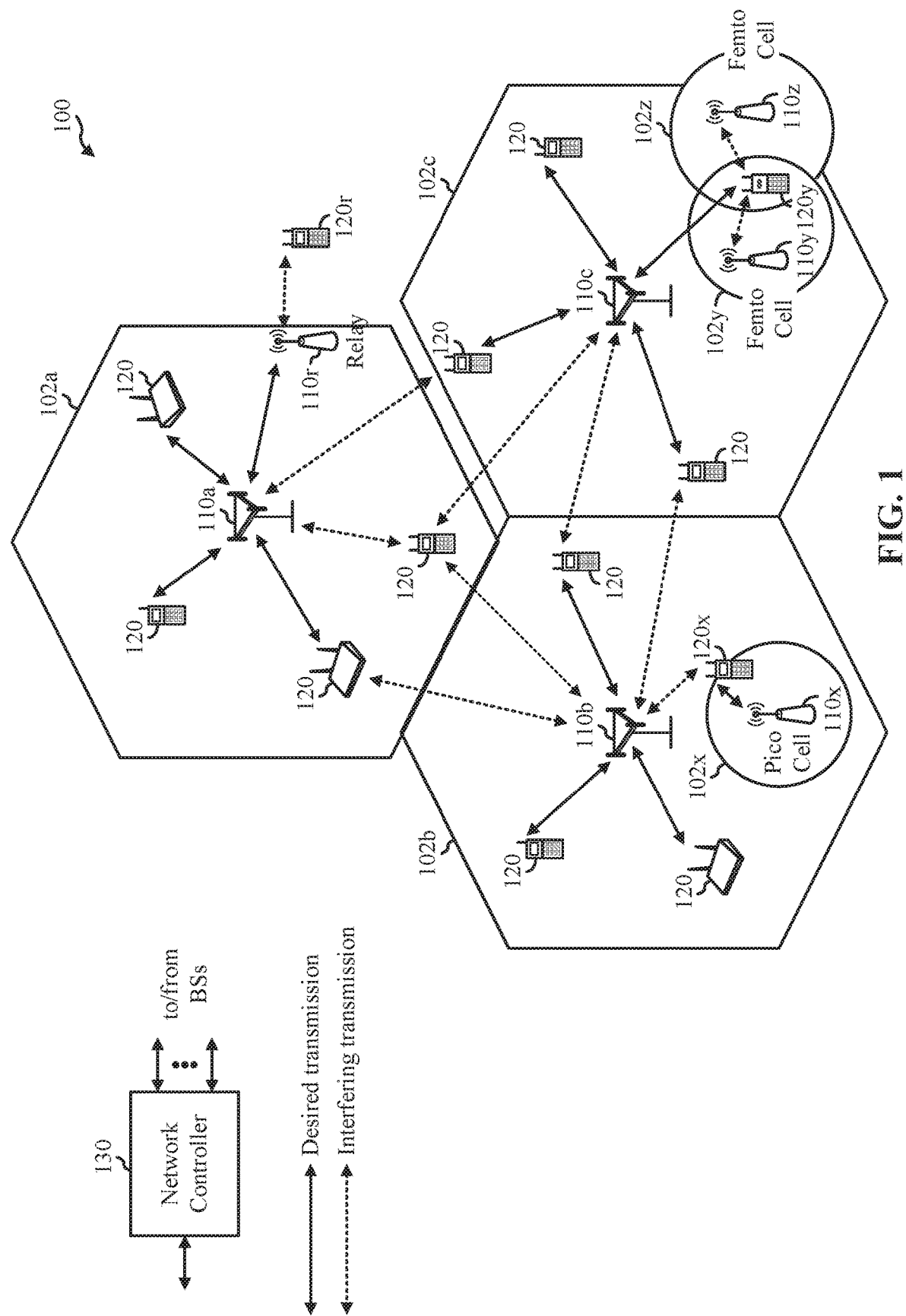
FIG. 1 is a block diagram conceptually illustrating an example telecommunications system, in accordance with certain aspects of the present disclosure.

Aspects of the present disclosure provide apparatus, methods, processing systems, and computer readable mediums for providing precoders for uplink sound reference signals (SRS) transmissions.

On the uplink SRS may be used for beam management, codebook based uplink transmission, and/or non-codebook based uplink transmission. And on the downlink SRS may be used for antenna switching and/or channel reciprocity for the base station (BS) to obtain the downlink channel. In some cases, the UE may have asymmetry of its transmit and receive chains. For example, the UE may have less transmit chains than receive chains. The UE may perform SRS antenna switching to make use of all of the antennas. For example, the BS can configure the UE with two SRS resources, each using different antennas. The UE can switch between the SRS resources for SRS transmission in different symbols. However, for cell-edge UEs, for example, the sounding quality could be poor. Therefore, techniques for SRS transmission with improved sounding quality are desirable.

Accordingly, aspects of the present disclosure provide for SRS precoding that may be used to improve the sounding quality. In some examples, the BS provides the UE with precoders associated with the configured SRS resources. The UE may apply the precoders for SRS transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF), 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. A BS 110 in the wireless communication network 100 configures a UE 120 with a sounding reference signal (SRS) configuration. The SRS configuration configures one or more SRS resource sets, each resource set including one or more SRS resources, and each SRS resource comprising one or more SRS ports. The BS 110 provides the UE 120 with a set of precoders via an indicator, the set of precoders including a precoder associated with each SRS resource. The UE 120 determines one or more precoders to apply for one or more SRS transmissions via one or more of the configured SRS resources.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG). UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
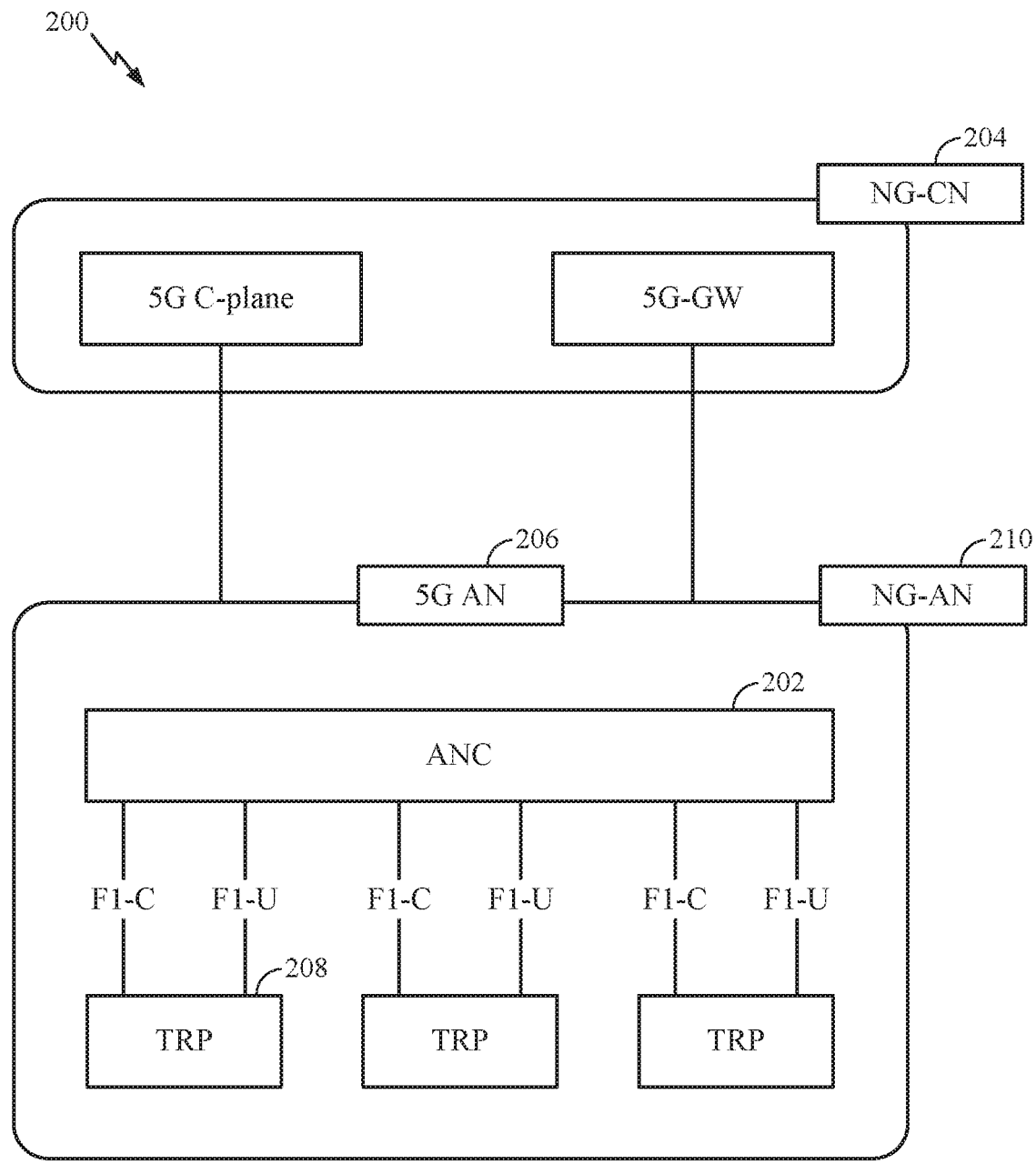
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may sham features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
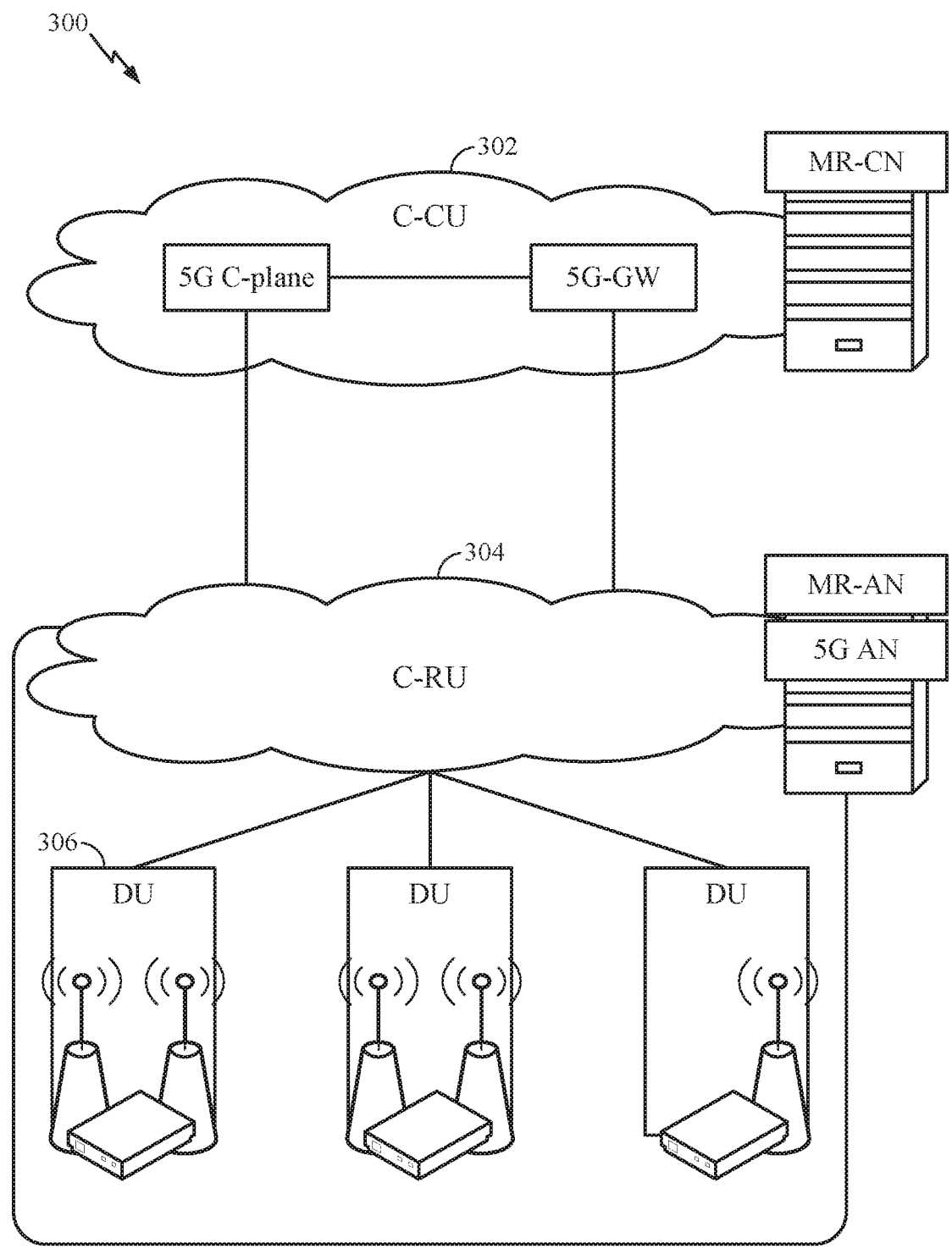
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
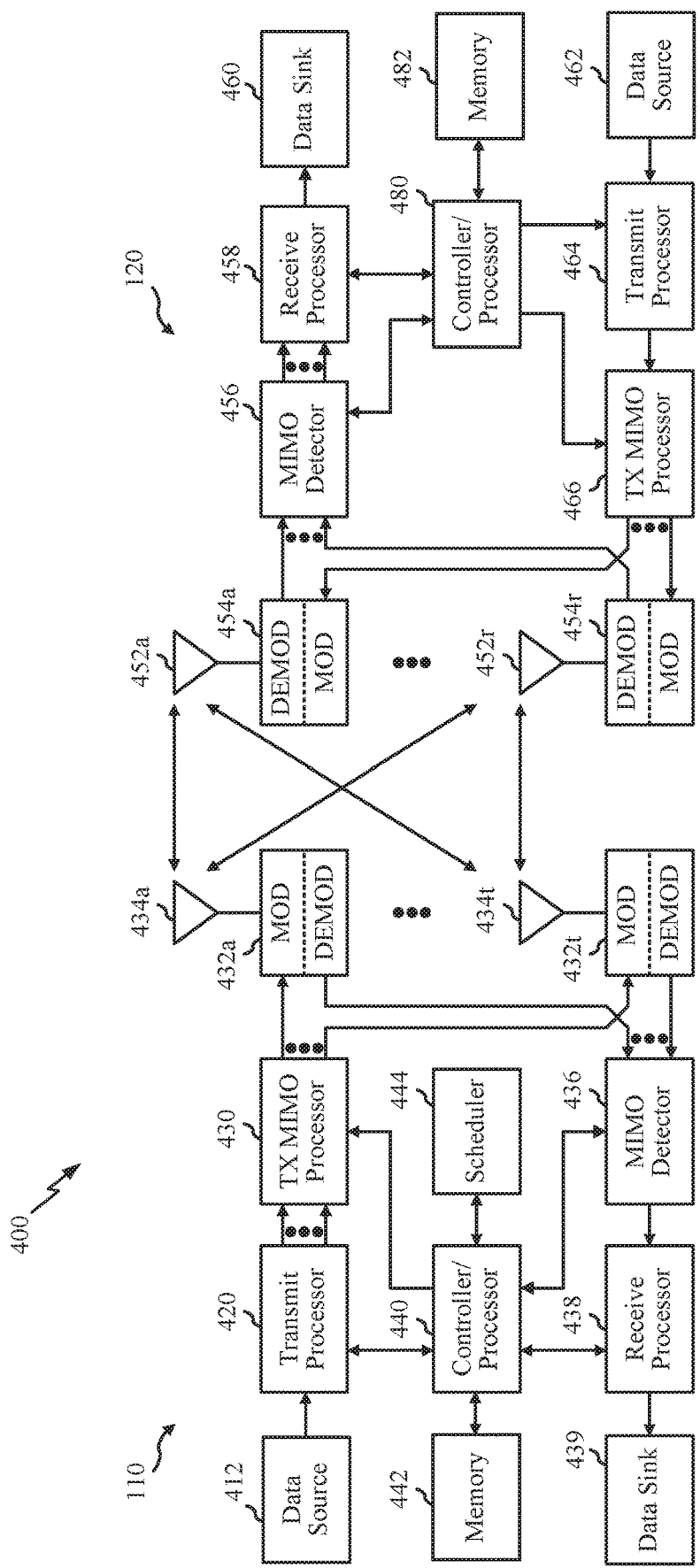
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for uplink SRS with precoding.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
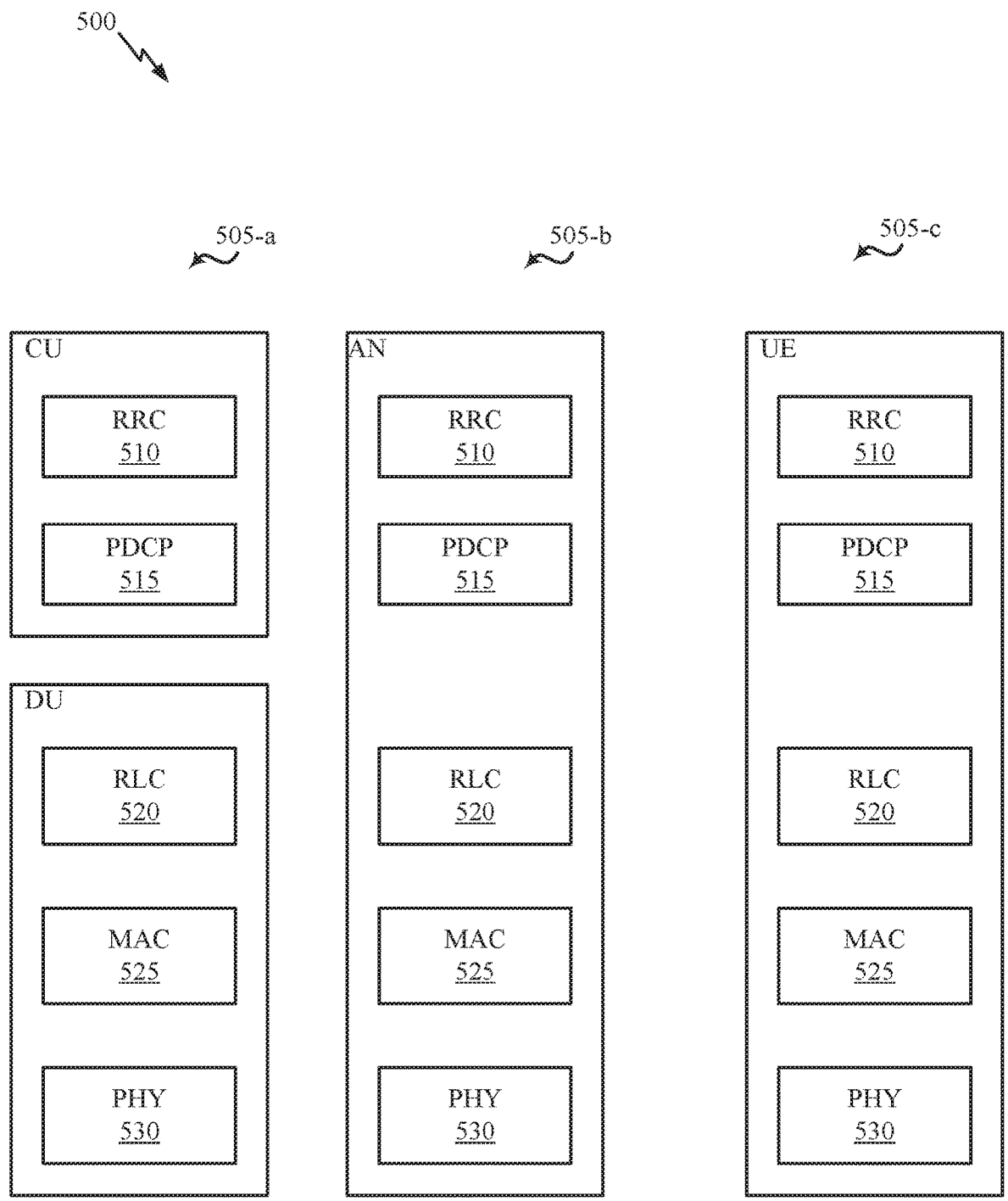
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic T11 is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
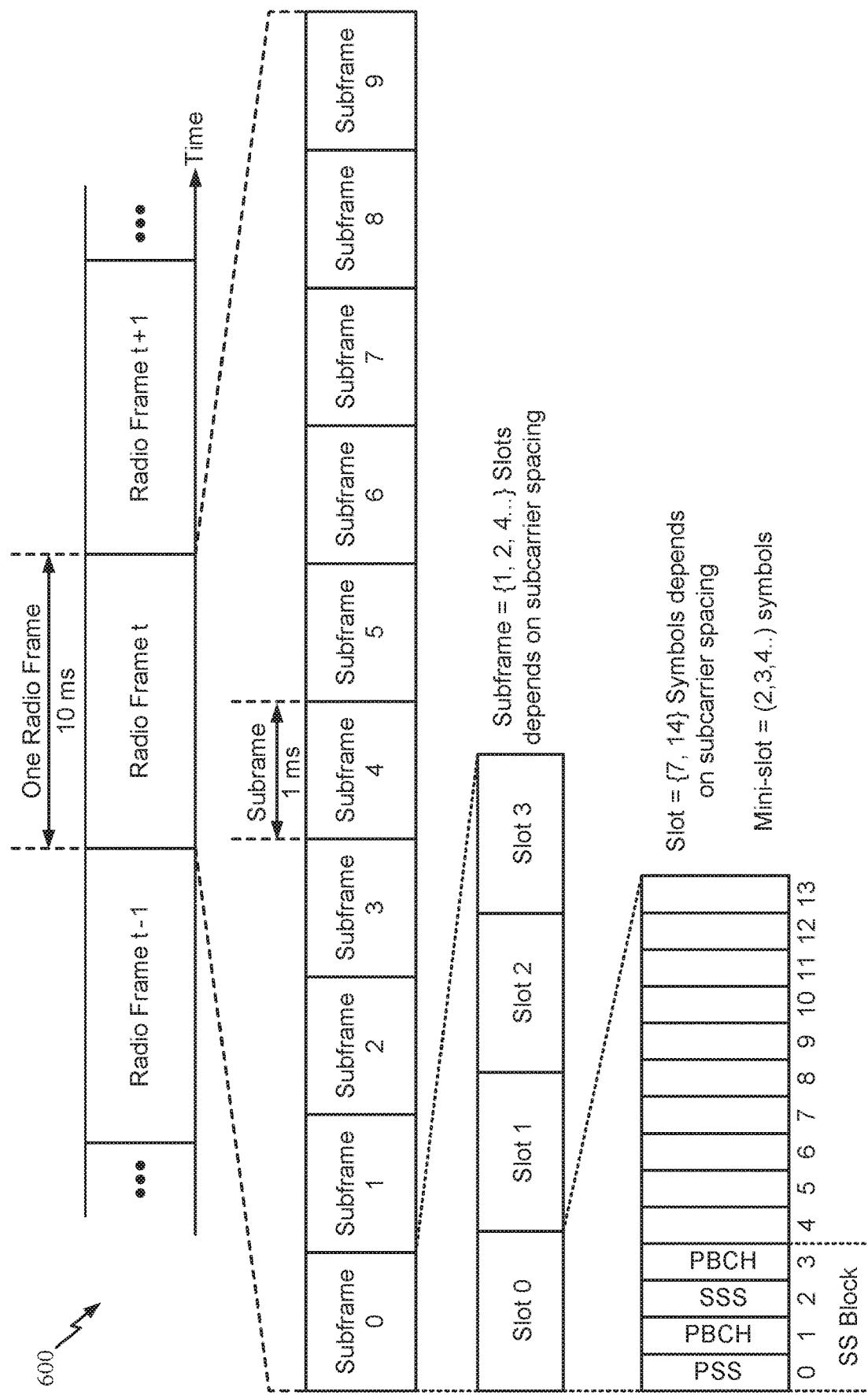
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Uplink SRS with Precoding

In certain systems, such as NR (new radio or 5G radio technology), the base station (BS), such a transmission reception point (TRP) or Next Generation Node B (gNB), configures user equipment (UE) for uplink sounding reference signal (SRS) transmission. On the uplink SRS may be used for beam management, codebook based uplink transmission, and/or non-codebook based uplink transmission. And on the downlink SRS may be used for antenna switching and/or channel reciprocity for the BS to obtain the downlink channel. For DL-UL channel reciprocity, the BS acquires the DL channel estimate based on the UL SRS from the UE.

In some cases, the UE may have asymmetry of its transmit and receive chains. In some examples, the UE may have less transmit chains than receive chains. For a UE with four antennas, the UE may be capable of using one antenna for transmitting and four antennas for receiving (denoted as 1T2R); 2T4R; or 1T4R/2T4R (i.e., UE supports 1T4R and 2T4R). Thus, the UE may only be able to transmit Thus, although the UE may have four antennas, the UE may only be able to use two antennas to transmit up to two layers simultaneously. The UE may perform SRS antenna switching to make use of all of the antennas.

The can reports its capability and the UE may be configured for the SRS switching based on the UE capability. To configure SRS, the BS can configure the UE with an SRS configuration. The SRS configuration configures UE with one or more SRS resource sets (e.g., up to 2 resource sets). The SRS resource set can include one or more SRS resources (e.g., 2 or 4 SRS resources for SRS switching), each SRS including one or more SRS ports (e.g., 1, 2, or 4 ports) that are mapped to a transmit (TX) or receive (RX) component, such as a UE port, that is logically mapped to one or more of the UE antennas.

Figure 7A:
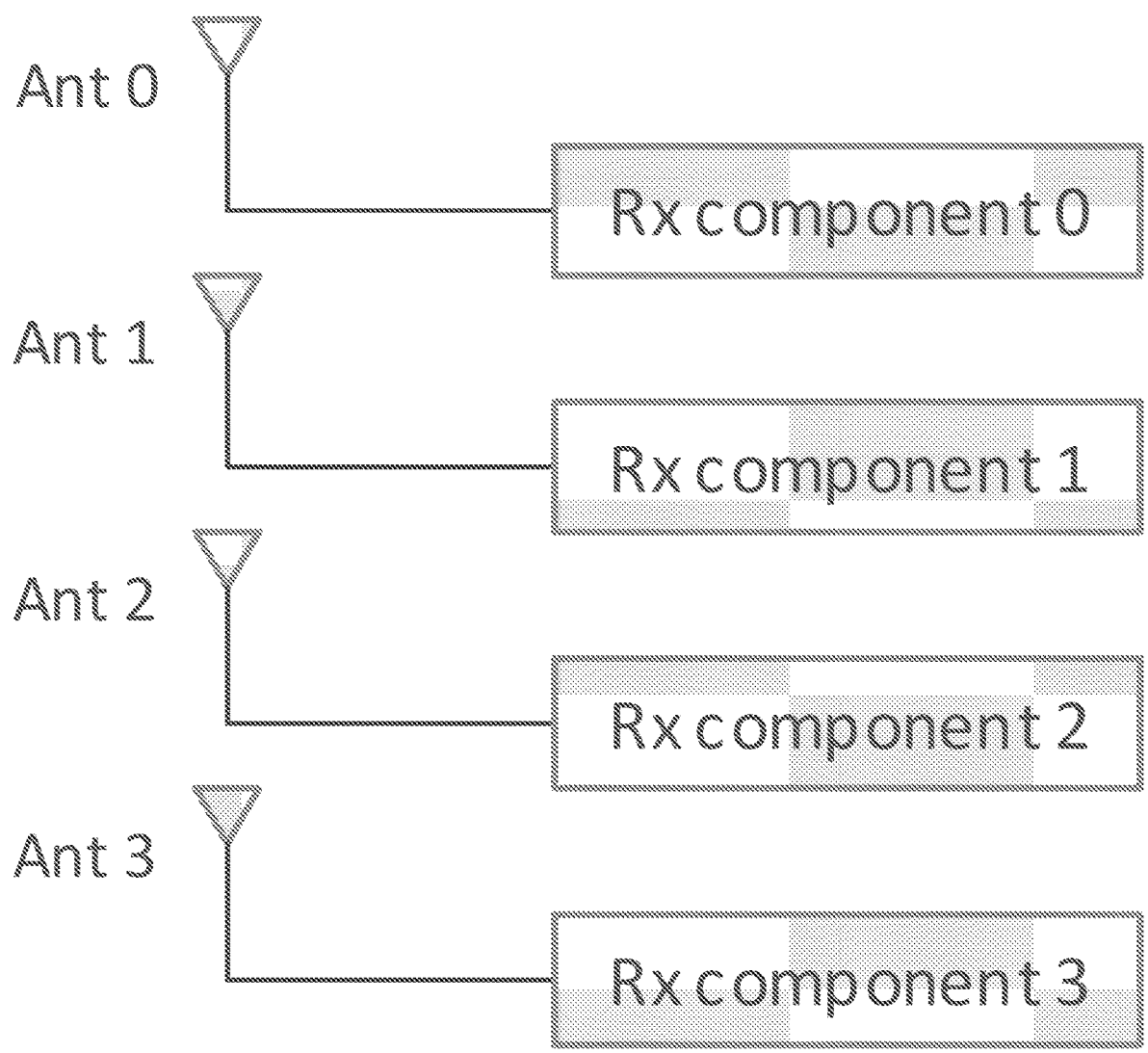
FIG. 7A is a block diagram showing example mapping of UE ports for a UE with four antennas and four receive chains, in accordance with certain aspects of the present disclosure.
Figure 7B:
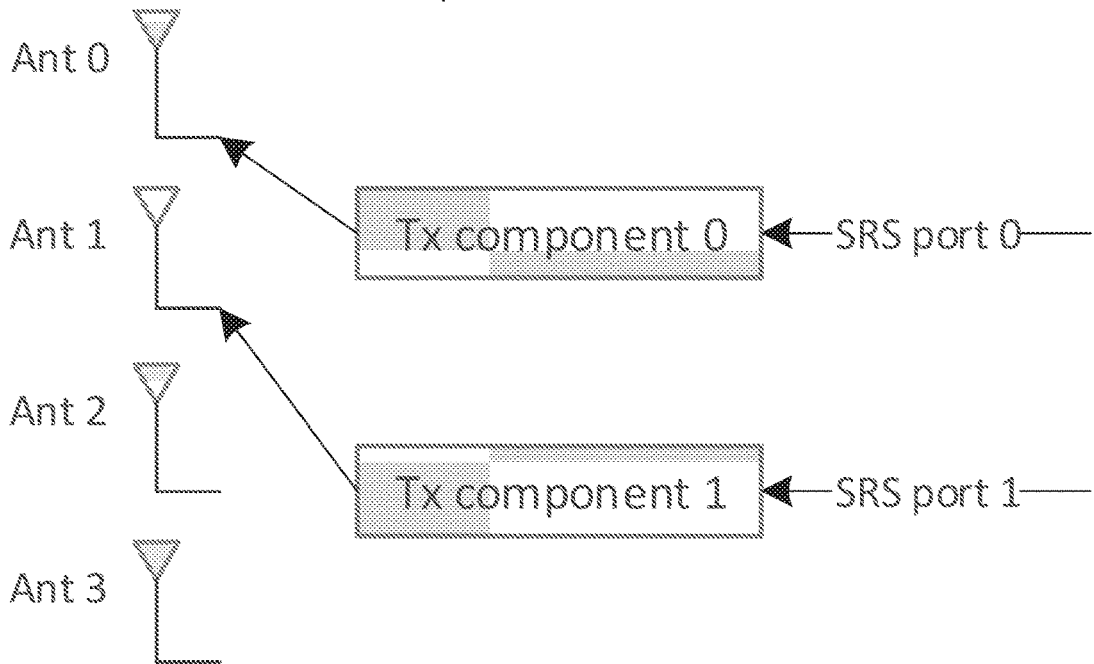
FIG. 7B is a block diagram showing an example mapping of sounding reference signal (SRS) ports to UE ports for a UE with four antennas and two transmit chains for a first configured SRS resource, in accordance with certain aspects of the present disclosure.
Figure 7C:
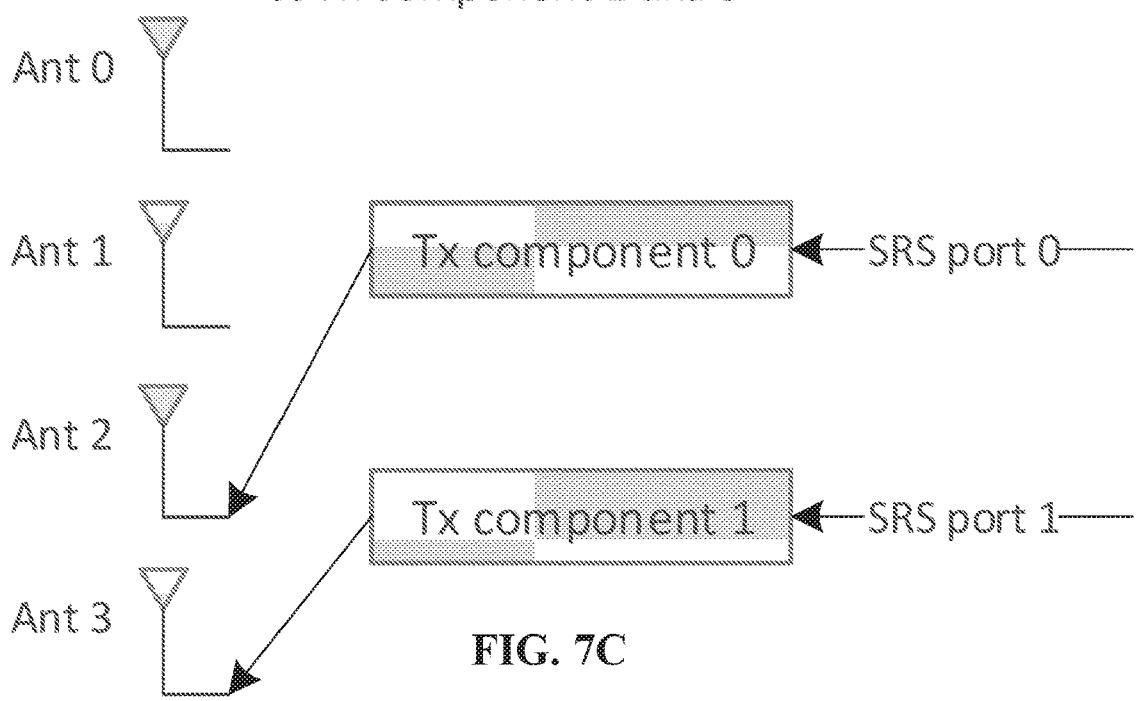
FIG. 7C is a block diagram showing an example mapping of SRS ports to UE ports for a UE with four antennas and two transmit chains for a second configured SRS resource, in accordance with certain aspects of the present disclosure.
Figure 8A:
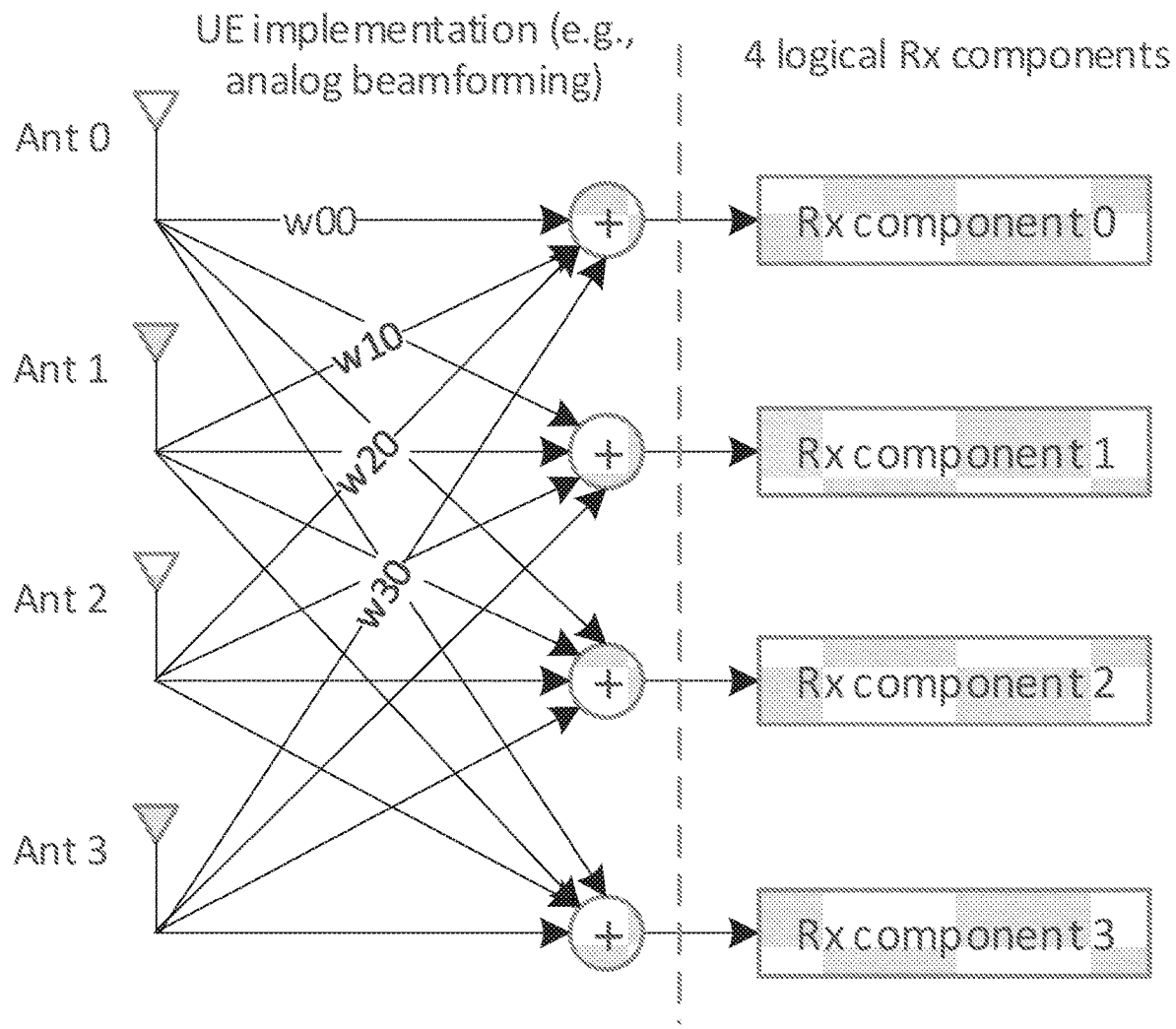
FIG. 8A is a block diagram showing example mapping of UE ports for a UE with four antennas with beamforming and four receive chains, in accordance with certain aspects of the present disclosure.
Figure 8B:
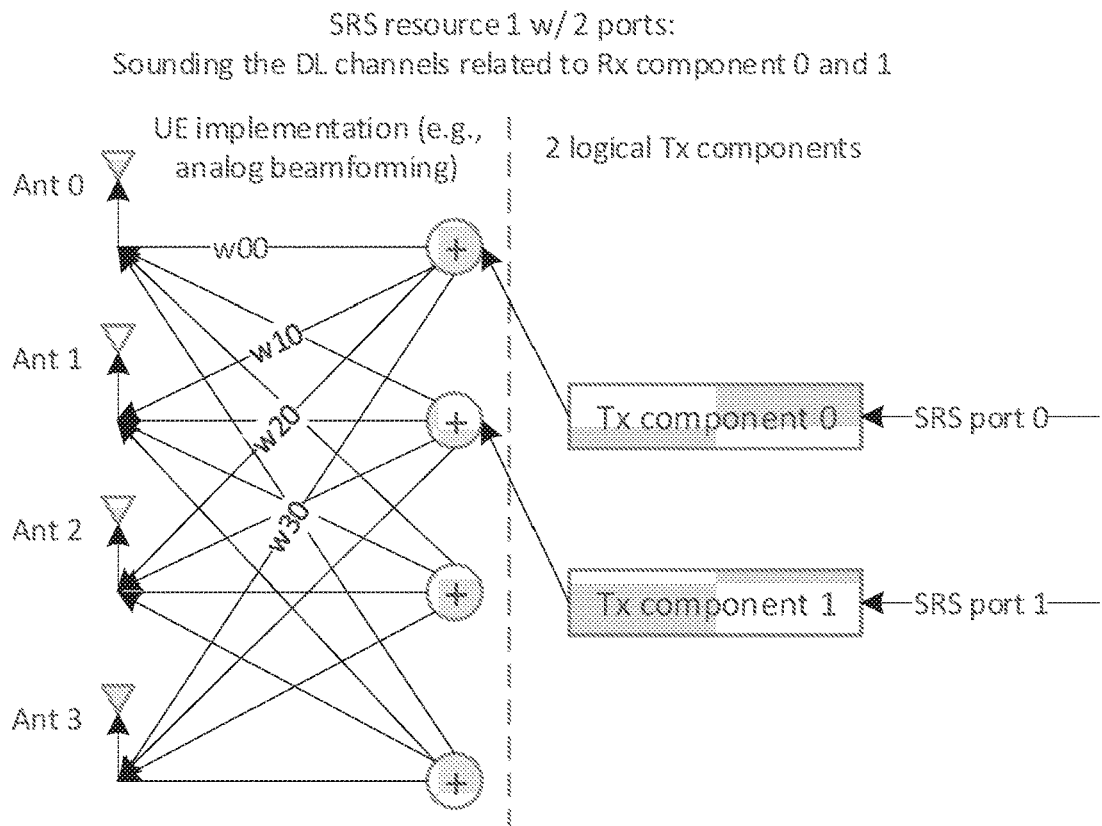
FIG. 8B is a block diagram showing an example mapping of SRS ports to UE ports for a UE with four antennas with beamforming and two transmit chains for a first configured SRS resource, in accordance with certain aspects of the present disclosure.
Figure 8C:
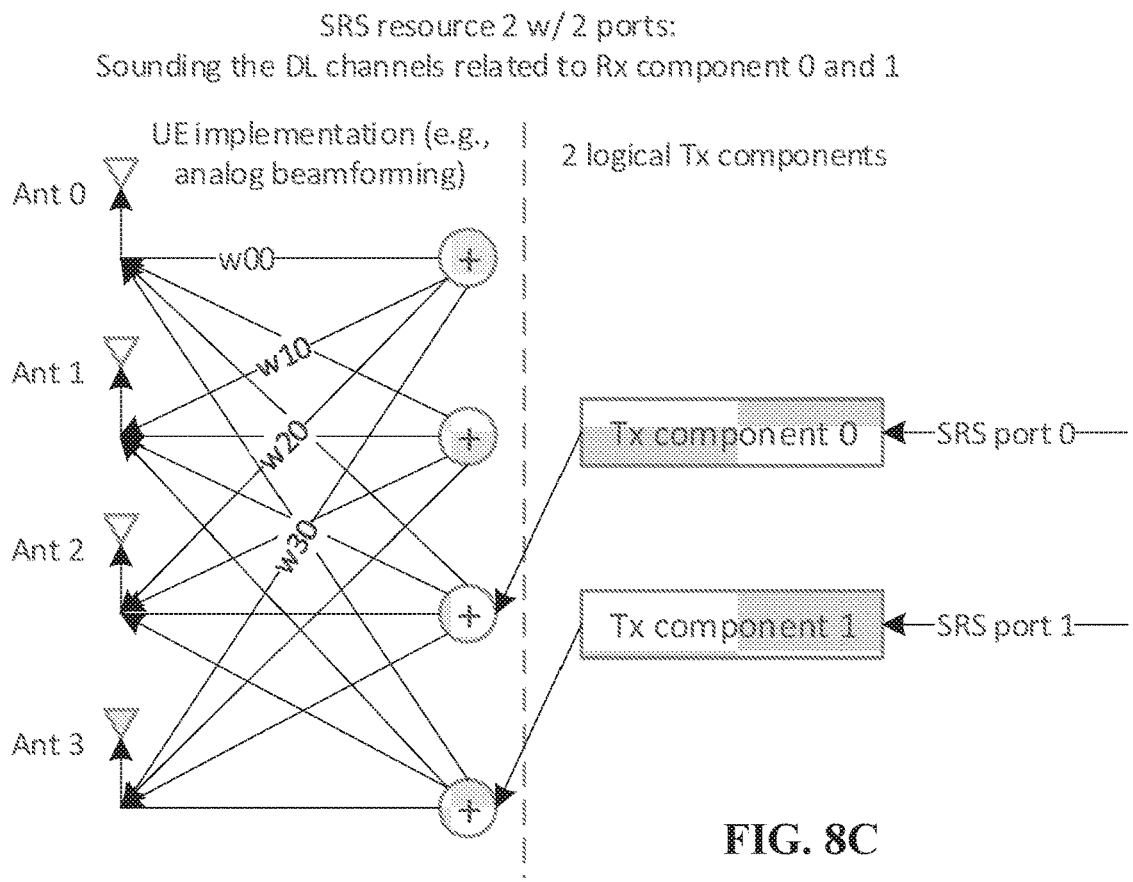
FIG. 8C is a block diagram showing an example mapping of SRS ports to UE ports for a UE with four antennas with beamforming and two transmit chains for a second configured SRS resource, in accordance with certain aspects of the present disclosure.

In one illustrative example, the BS may configure one SRS resource set with four SRS resources, each SRS resource with one SRS port. FIG. 7A is a block diagram showing example mapping of UE ports (Rx Components 0-3) for a UE with four antennas (antennas 0-3) and four receive chains, in accordance with certain aspects of the present disclosure. In another illustrative example, the BS may configure the UE with an SRS resource set with two resources for antenna switching, each with two SRS ports. As shown in FIG. 7B, the BS configures the UE with an SRS configuration including the SRS Resource 1 with SRS port 0 mapped to the Tx Component 0 that is mapped to the antenna 0, and the SRS port 1 mapped to the Tx Component 1 that is mapped to the antenna 1. As shown in FIG. 7C, the SRS configuration includes the SRS Resource 1 with SRS port 0 mapped to the Tx Component 0 that is mapped to the antenna 2, and the SRS port 1 mapped to the Tx Component 1 that is mapped to the antenna 3. Analog beamforming may be used. As shown in the FIGS. 8A-8C, different beams from the UE antennas (0-3) can be mapped to multiple of the Tx and Rx components. Weighting coefficients (e.g., w00, w10, w20, w30) can be applied to the beams.

The BS triggers a configured SRS resource set. The BS may trigger one SRS resource. When the BS triggers the SRS resource set, all of the SRS resources of the set are triggered. The BS triggers a periodic or semi-persistent SRS resource set via radio resource control (RRC) signaling or a medium access control (MAC) control element (CE). The BS triggers aperiodic SRS resource set via downlink control information (DCI).

The UE can switch between the SRS resources for SRS transmission in different time periods (e.g., different symbols or slots). For example, the UE uses resource 1 to transmit an SRS pilot using antenna 0 and antenna 1, then, in the next symbol, the UE uses resource 2 to transmit an SRS using antenna 2 and antenna 3. Thus, by combining channel estimates in different symbols for the different antennas, the BS receives the uplink channel from four UE antennas.

However, for cell-edge UEs, for example, the sounding quality could be poor. Therefore, techniques for SRS transmission with improved sounding quality are desirable.

Accordingly, aspects of the present disclosure provide for SRS precoding that may be used to improve the sounding quality. In some examples, the BS provides the UE with precoders associated with the configured SRS resources. The UE may apply the precoders for SRS transmission. In some aspects, techniques are provided for SRS triggering with configured transmitting precoding matrix indicator (TPMI).

Figure 9:
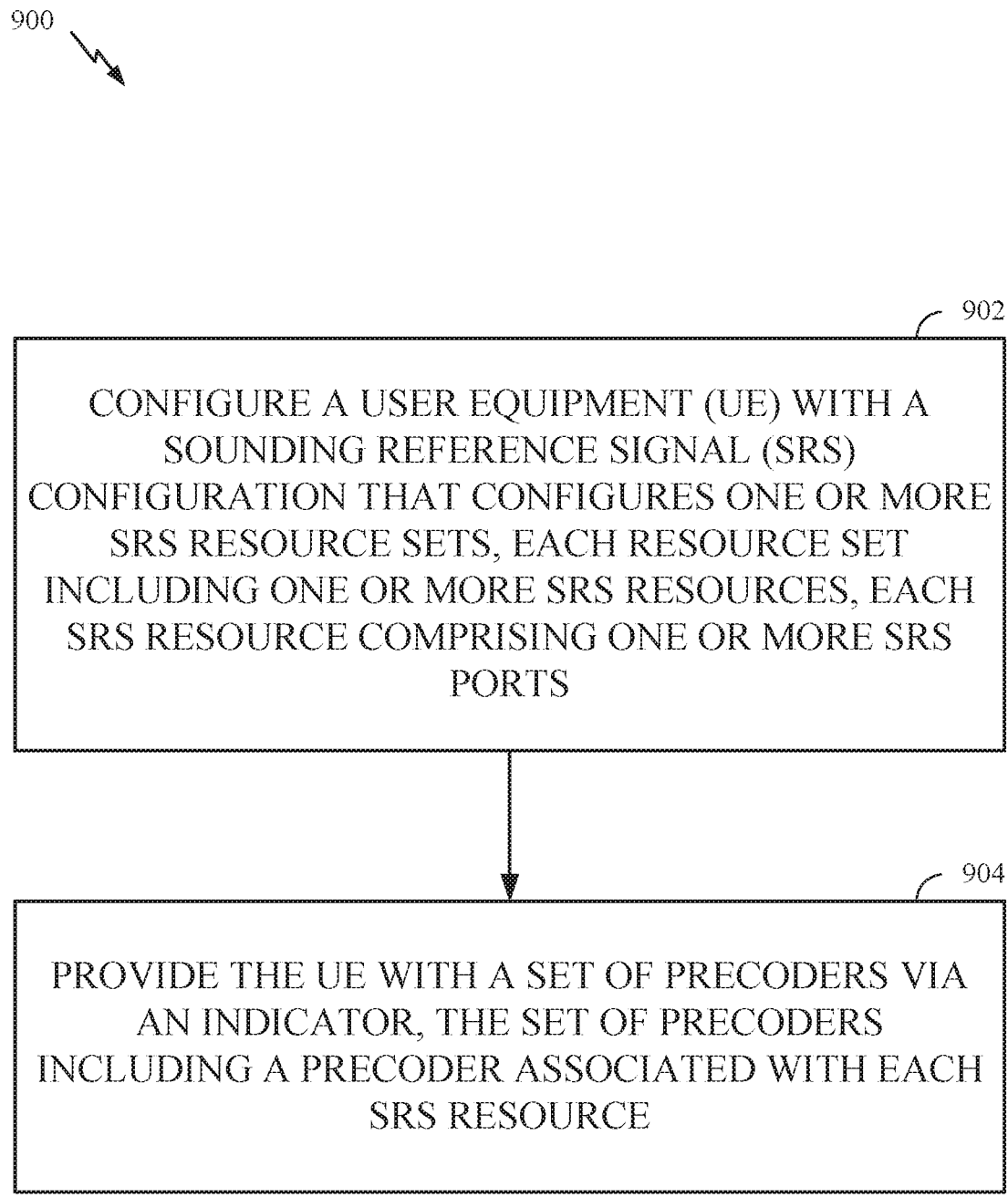
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as a BS 110 in the wireless communication network 100).

The operations 900 may begin, at 902, by configuring a UE with a SRS configuration that configures one or more SRS resource sets. Each resource set includes one or more SRS resources and each SRS resource has one or more SRS ports. The BS may configure the SRS configuration via RRC signaling.

At 904, the BS provides the UE with a set of precoders via an indicator (e.g., S-TPMI). The set of precoders includes a precoder associated with each SRS resource. In some examples, the BS provides the UE with a set of TPMI for uplink data (e.g., PUSCH). The BS may select from the set of TPMI for the uplink data for the SRS. Examples of TPMI used for PUSCH include the TPMI for PUSCH in the 3GPP standards TS 38.211 Table 6.3.1.5-1 through Table 6.3.1.5-7, shown in FIGS. 15-21, respectively. In some examples, according to the table for PUSCH, if there are two transmit antennas (e.g., two transmit chains) and one port (or one layer), then there are six candidate precoders; and if there are two transmit antennas and two ports (or two layers), then there are three candidate precoders. If there are four transmit antennas, for one port, there are twenty-eight candidate precoders; for two ports, there are twenty-two candidate precoders; for three ports, there are seven candidate precoders; and for four ports, there are five candidate precoders.

The SRS precoders map the SRS ports to UE antenna ports. The UE antenna ports may map to one or more transmit antennas of the UE or one or more transmit beams of the transmit antennas.

Figure 11A:
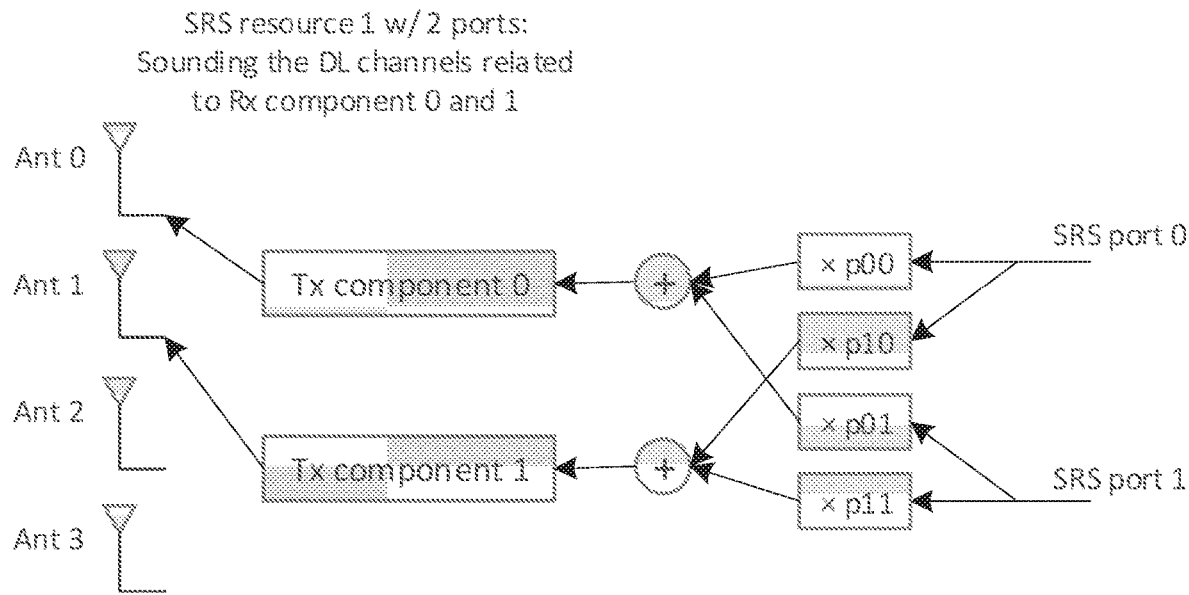
FIG. 11A is a block diagram showing an example mapping of SRS ports to UE ports for a UE with four antennas and two transmit chains for a first configured SRS resource using a precoder, in accordance with certain aspects of the present disclosure.
Figure 11B:
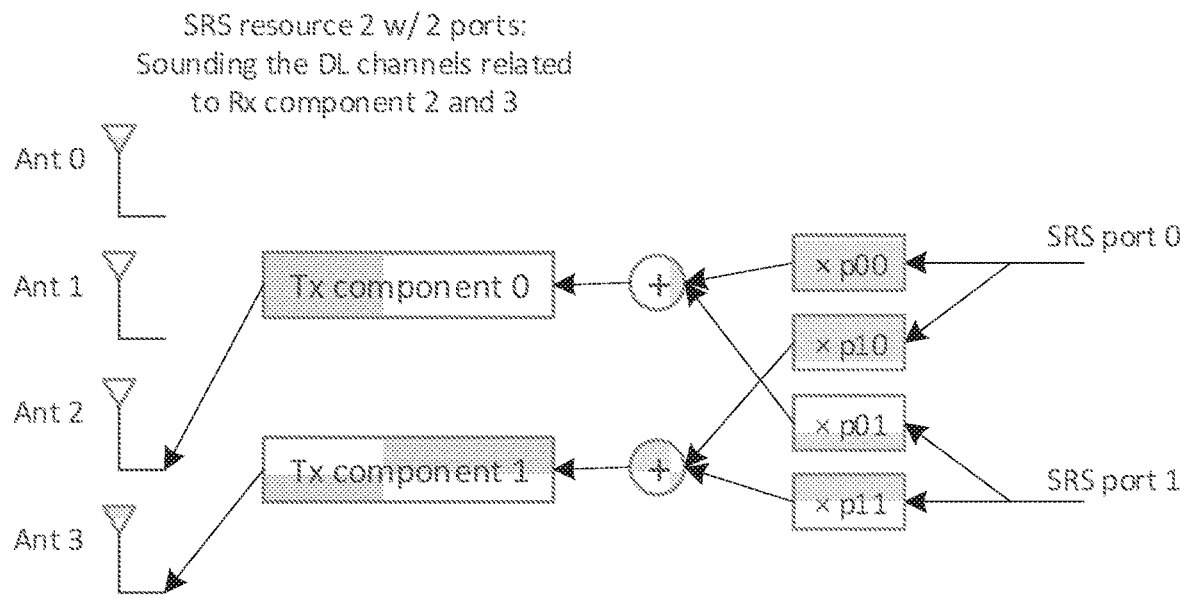
FIG. 11B is a block diagram showing an example mapping of SRS ports to UE ports for a UE with four antennas and two transmit chains for a second configured SRS resource using a precoder, in accordance with certain aspects of the present disclosure.

FIG. 11A and FIG. 11B are block diagrams showing example mappings of SRS ports to UE ports for a 2T4R UE for two SRS resources using a precoder, in accordance with certain aspects of the present disclosure. As shown in FIG. 11A, the example precoder $$\begin{bmatrix} p_{00} & p_{01} \\ p_{10} & p_{11} \end{bmatrix}$$

is applied to SRS resource 1. The precoder maps the SRS port 0 and SRS port 1, of the SRS resource 1, to the Tx component 0 and Tx component 1. The Tx components may be referred to as logical antennas or UE antenna ports. As shown in FIG. 11A, the precoder maps both of the SRS ports to both of the Tx components. The Tx component 0 maps to the UE antenna 0 and the Tx component 1 maps to the UE antenna 1. As shown in FIG. 11B, for SRS resource 2, the Tx component 0 maps to the UE antenna 2 and the Tx component 1 maps to the UE antenna 3. Thus, the SRS resource 1 and the SRS resource 2 may be used for antenna switching.

Figure 12A:
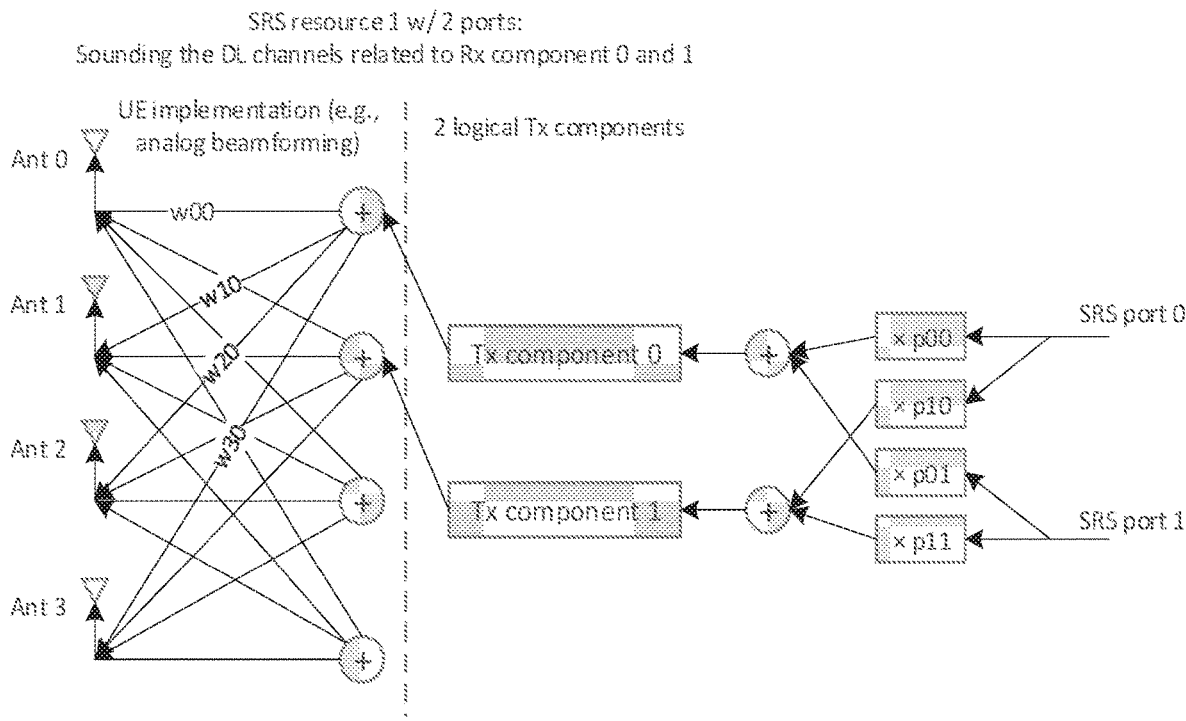
FIG. 12A is a block diagram showing an example mapping of SRS ports to UE ports for a UE with four antennas with beamforming and two transmit chains for a first configured SRS resource using a precoder, in accordance with certain aspects of the present disclosure.
Figure 12B:
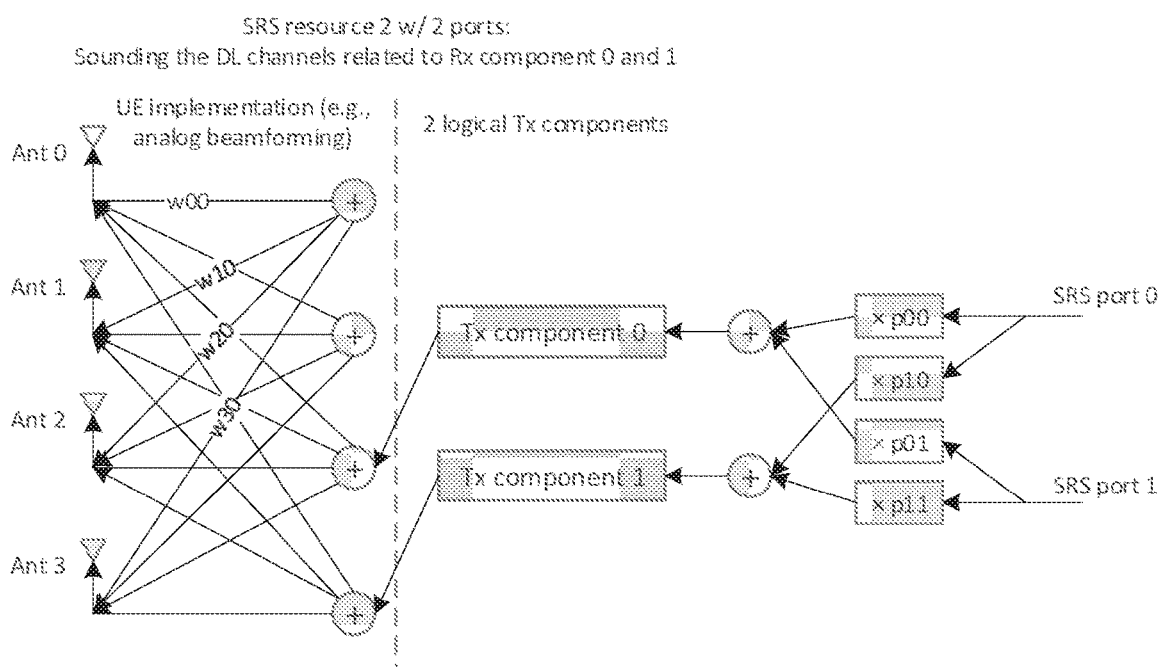
FIG. 12B is a block diagram showing an example mapping of SRS ports to UE ports for a UE with four antennas with beamforming and two transmit chains for a second configured SRS resource using a precoder, in accordance with certain aspects of the present disclosure.

As shown in FIG. 11A and FIG. 11B, the precoder applied to different SRS resources may be the same. In the examples, the precoder may be applied. For example, although not shown, for an example SRS resource 3, the Tx component 0 and Tx component 1 may be mapped to antenna pair 0 and 1, as for the SRS resource 1, but applied with a different precoder than the precoder applied for the SRS resource 1. For an example SRS resource 4, Tx component 0 and Tx component 1 may be mapped to the antenna pair 2 and 3, as for the SRS resource 2, but applied with a different precoder than the precoder applied for the SRS resource 2. Thus, the SRS resources 1-4 may be used for SRS precoder and/or SRS antenna switching. As shown in FIG. 12A and FIG. 12B, the SRS resources may be mapped to weighted antenna beams. For example, as shown in FIG. 12A and FIG. 12B, the Tx component 0 and Tx component 1 each map to a beam from all four antennas; however, for SRS resource 1 and SRS resource 2, the Tx component 0 and TX component 1 map to different UE antenna ports that may be mapped to the antennas by different weightings.

According to certain aspects, the set of SRS precoders may be configured with the SRS configuration (e.g., by RRC signaling). For example, a set of S-TPMI may be configured in the SRS configuration. For each resource included in the SRS resource set, the BS provides a precoder indicated via S-TPMI. The bitwidth of the S-TPMI depends on the UE capability (e.g., 1T, 2T, or 4T) and the number of ports in the corresponding SRS resource. In some examples, the BS may configure (e.g., via RRC) the UE with a restricted subset of a set of possible precoders and the set of precoders provided to the UE via the indicator (e.g., S-TPMI) is selected from the restricted subset.

In some examples, the number of precoders in the set of precoders is equal to the number SRS resources in the SRS resource set. Thus, the precoders provided via S-TPMI may be resource-wise associated with the corresponding SRS resource, for example, by a one-to-one mapping. For example, the set of precoders is provided in a first ordered list, the SRS resources are provided in a second ordered list, and each precoder in the first list is associated with a corresponding SRS resource in the second list. In some examples, in an RRC signaling, the S-TPMI may be configured as: Srs-TpmiList SEQUENCE (SIZE(1 . . . maxN-rofSRS-ResourcesPerSet)) OF S-TpmiId-OPTIONAL, —Cond antennaSwitching. In some examples, further RRC signaling can configure a set of candidate S-TPMI, for example, for each UE Tx capability and number of ports of SRS resource. Then RRC signaling may configure the precoder from the set.

According to certain aspects, the set of SRS precoders (e.g., S-TPMI) is configured in the uplink-related DCI (e.g., for aperiodic SRS). As discussed above, the BS triggers a configured SRS resource set. For example, periodic SRS resource sets or semi-persistent SRS resource sets are triggered via RRC signaling or a MAC-CE, and aperiodic SRS resource sets are triggered via DCI. In some examples, the set of precoders is provided with the trigger. When the SRS request in UL-related DCI triggers one SRS resource set, all the resources of the set are triggered. For each triggered resource, the BS provides, via a new field in the DCI, an S-TPMI used to transmit the SRS in that resource. In some example, the BS RRC signals the UE to indicate a set of candidate S-TPMI for each UE Tx capability and number of ports of a SRS resource. In some example, DCI indicates which candidate S-TPMI is chosen for a particular SRS resource. In this case, a constant payload can be maintained for the S-TMPI indication, regardless how many ports are configured per SRS resource.

According to certain aspects, SRS ports of triggered SRS resources should be mapped to different UE antenna ports or be provided different precoders. When an SRS resource set is triggered with S-TPMI, the BS and UE may know that the SRS ports are mapped to the UE antenna ports (e.g., all of the Tx components) via the configured precoder. When an SRS resource set is triggered without a precoder, then one SRS port is mapped to only one UE antenna ports.

According to certain aspects, the BS determines whether the SRS resources are associated with all different UE antenna ports or at least one same UE antenna port. As discussed above, the SRS ports are mapped to the UE antenna ports (Tx components) via the configured precoder.

According to certain aspects, the BS (and/or UE) can determine whether the SRS ports in any two resources are associated with the same or different UE antenna ports based on similarity of the precoders. When the SRS ports in the SRS resources are associated with different UE antenna ports, the SRS resources can be provided with the same precoder. When the SRS ports in the SRS resources are associated with at least one same UE antenna port, the SRS resources may be provided with different precoders. Thus, based on whether the SRS resources have the same or different precoder, the BS or UE can determine whether the SRS resources are associated with the same UE antenna port(s). For example, the precoders provided for two SRS resources are the same when the two SRS resources are associated with all different UE antenna ports and the precoders provided for two SRS resources are different when the two SRS resources are associated with at least one same UE antenna port.

According to certain aspects, the BS (and/or UE) can determine whether the SRS ports in any two resources are associated with the same or different UE antenna ports based on the number of SRS resources in the configured SRS resource set and the number of SRS ports associated with the SRS resources. In some examples, the BS determines that SRS resources are associated with at least one same UE antenna port when at least one of the number of the SRS resources is smaller than or equal to a threshold, or the number of SRS ports is equal to or greater than a second threshold. In some examples, the BS determines SRS resources are associated with all different UE antenna port when the number of the SRS resources is greater or equal to a threshold, or the number of SRS ports is equal to or smaller than a second threshold.

In an illustrative example, the SRS resource set is configured with SRS resource 1 and SRS resource 2. If both of the SRS resources are configured with 1 or 2 SRS ports each, then the SRS ports in the two SRS resources are associated with different UE antenna ports and, therefore, the two SRS resources can be provided with the same precoder. If both of the SRS resources are configured with 3 or 4 SRS ports each, then the SRS ports in the two SRS resources are associated with the same UE antenna ports (or at least one of the same) and, therefore, the two SRS resources should be provided with different precoders.

In another illustrative example, the SRS resource set is configured with fours SRS resources; SRS resource 1, SRS resource 2. SRS resource 3, and SRS resource 4. If the SRS resources are each configured with 1 or 2 SRS ports, then the SRS ports in a portion (e.g., half) of the SRS resources, for example SRS resource 1 and SRS resource 2, are associated with the same UE antenna ports (or at least some of the same) as each other and the SRS ports in another portion of the SRS resources, for examples SRS resource 3 and SRS resource 4, are associated with the same UE antenna ports (or at least some of the same) as each other, while the SRS ports in the first portion are associated with different UE antenna ports that the SRS ports in the other portion of the SRS resources. In this example, SRS resources 1 and 2 may be provided the same precoder and SRS resource 2 and 3 can be provided the same precoder—this is different than the precoder provider for SRS resources 1 and 2. If the four SRS resources are each configured with 3 or 4 antenna ports, then the SRS ports are associated with the same (or at least some of the same) UE antenna ports and, therefore, should all be provided with different precoders.

According to certain aspects, the BS (and/or UE) can determine whether the SRS ports in any two resources are associated with the same or different UE antenna ports based on SRS usage. In some examples, the SRS configuration configures the UE for SRS precoder switching, SRS antenna switching, or for both antenna and precoder switching. When the UE is configured for SRS precoder switching, the BS and/or UE may determine the SRS ports in the SRS resources are associated with at least one same UE antenna port. When the UE is configured for precoder and antenna switching, the BS and/or UE may determine the SRS ports of a first portion (e.g., first half) of the SRS resources are associated with at least one same UE antenna port, that the SRS ports of a second portion (e.g., second half) of the SRS resources are associated with at least one same UE antenna port, and the SRS ports of the first and second portions are associated with all different UE antenna ports.

Figure 10:
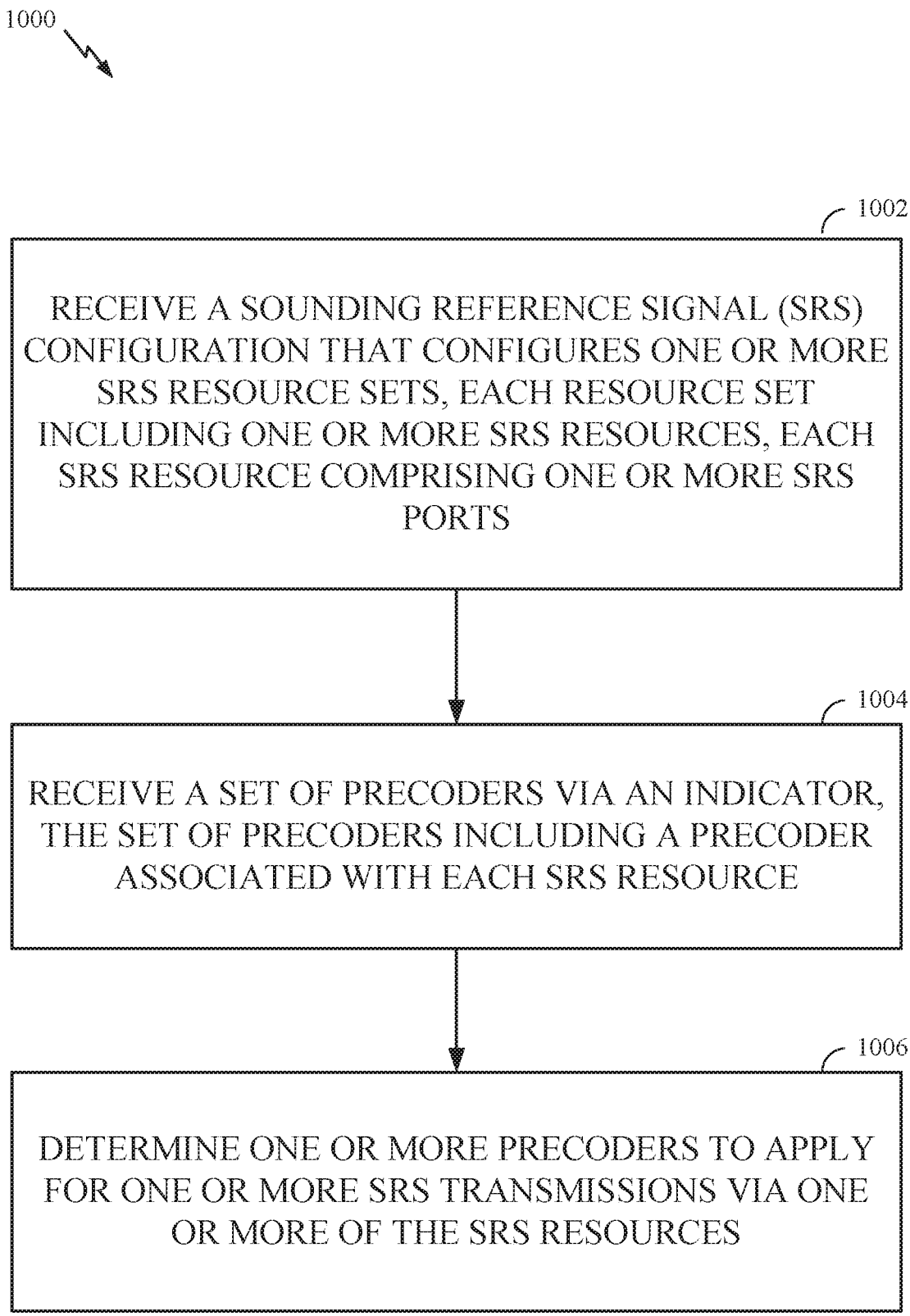
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be complimentary operation by the BS to the operations 900 performed by the UE.

The operations 1000 may begin, at 1002, by receiving a SRS configuration that configures one or more SRS resource sets, each resource set including one or more SRS resources, each SRS resource comprising one or more SRS ports.

At 1004, the UE receives a set of precoders via an indicator, the set of precoders including a precoder associated with each SRS resource. The precoders may be from a set of TPMI configured for PUSCH. The set of precoders may be provided via RRC signaling, DCI, or a MAC-CE. The set of precoders may be provided with the SRS configuration or with a SRS resource trigger. In some examples, the UE may receive a restricted subset of possible precoders and the indicated set of precoder may be from the restricted subset. In some examples, the UE may be configured with a list of precoders that is one-to-one associated with a list of SRS resources.

At 1006, the UE determines one or more precoders to apply for one or more SRS transmissions via one or more of the SRS resources. The precoder maps the SRS ports of the SRS resources to UE antenna ports. SRS ports of SRS resources may be mapped to different antenna ports or may be provided with different precoders. The UE may determine whether SRS ports of SRS resources are associated with the same or different UE antenna ports based on whether the SRS resources are provided with the same or different precoders, based on a number of SRS resources and/or UE antenna ports associated with the SRS resource, and/or based on a configured SRS usage.

Figure 13:
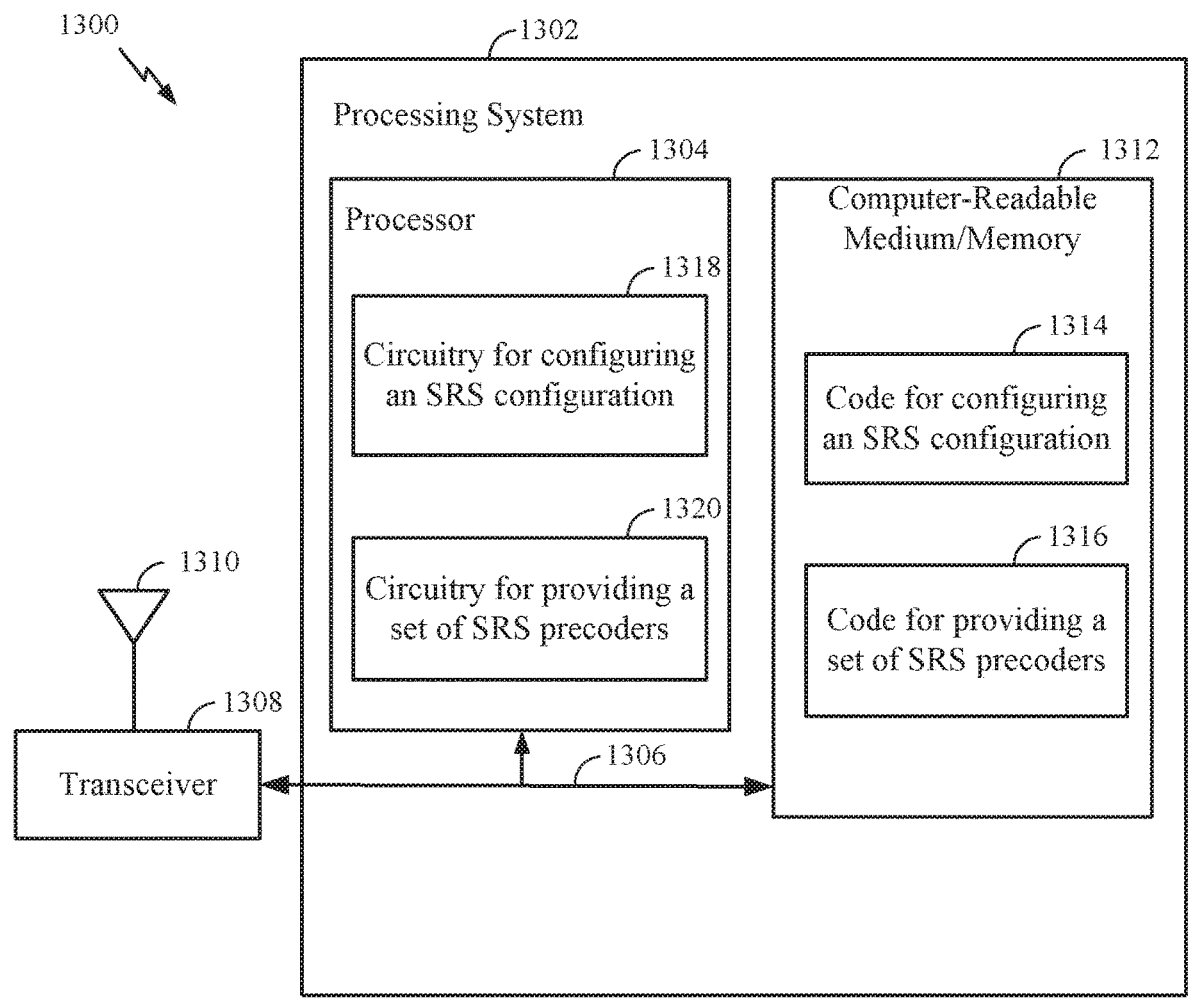
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein for uplink SRS transmission with precoding. In certain aspects, computer-readable medium/memory 1312 stores code 1314 for configuring the UE with an SRS configuration and code 1316 for providing the UE with a set of SRS precoders. In certain aspects, the processor 1304 has circuitry configured to implement the code stored in the computer-readable medium/memory 1312. The processor 1304 includes circuitry 1318 for providing the UE with the SRS configuration and circuitry 1320 for providing the UE with the set of SRS precoders.

Figure 14:
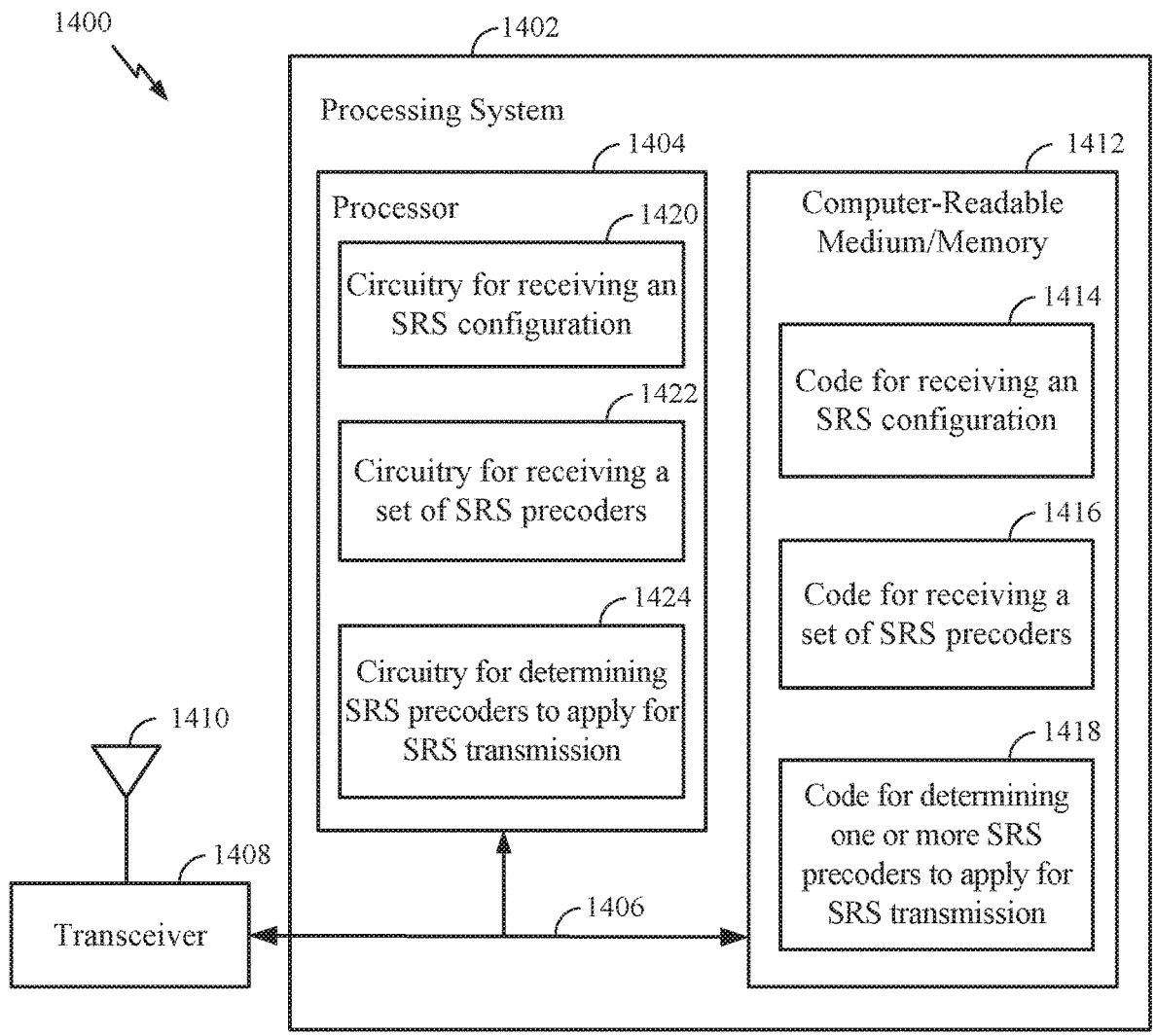
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10, or other operations for performing the various techniques discussed herein for uplink SRS transmission with precoding. In certain aspects, computer-readable medium/memory 1412 stores code 1414 for receiving an SRS configuration; code 1416 for receiving a set of SRS precoders; and code 1418 for determining one or more SRS precoders to apply for SRS transmission. In certain aspects, the processor 1404 has circuitry configured to implement the code stored in the computer-readable medium/memory 1412. The processor 1404 includes circuitry 1420 for receiving an SRS configuration; circuitry 1422 for receiving a set of SRS precoders; and circuitry 1424 for determining one or more SRS precoders to apply for SRS transmission.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory). EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9 and FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM. ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), the method comprising:
configuring a user equipment (UE) with a sounding reference signal (SRS) configuration that configures at least one SRS resource set, the at least one SRS resource set including one or more SRS resources in a first ordered list, each of the one or more SRS resources comprising one or more SRS ports; and
providing the UE with a set of precoders via one or more indicators, the set of precoders including a precoder associated with each of the one or more SRS resources, wherein:
a number of precoders in the set of precoders is equal to a number of the one or more SRS resources in the at least one SRS resource set,
providing the UE with the set of precoders comprises providing the UE with the set of precoders in a second ordered list, and
each precoder in the second ordered list is associated with a corresponding SRS resource in the first ordered list.

2. The method of claim 1, further comprising:
provustraing the UE with a set of transmission precoding matrix indicators (TPMI) for uplink data; and
selecting the set of precoders from the set of TPMI.

3. The method of claim 1, wherein each precoder of the set of precoders maps the one or more SRS ports of the associated SRS resource to one or more UE antenna ports.

4. The method of claim 3, wherein each of the one or more UE antenna ports is mapped to one or more transmit antennas of the UE or is mapped to one or more transmit beams of the one or more transmit antennas.

5. The method of claim 3, further comprising determining whether the one or more SRS resources are associated with all different UE antenna ports or are associated with at least one same UE antenna port.

6. The method of claim 5, wherein:
the precoders, of the set of precoders, provided for two SRS resources, of the at least one SRS resource set, are the same when the two SRS resources are associated with the all different UE antenna ports; and
the precoders, of the set of precoders, provided for two SRS resources, of the at least one SRS resource set, are different when the two SRS resources are associated with the at least one same UE antenna port.

7. The method of claim 5, wherein the determination is based on a number of the one or more SRS resources of the at least one SRS resource set and based on a number of the one or more SRS ports associated with the one or more SRS resources.

8. The method of claim 7, wherein the determination comprises determining the one or more SRS resources are associated with the at least one same UE antenna port when at least one of: the number of the one or more SRS resources is less than or equal to a first threshold or the number of the one or more SRS ports is equal to or greater than a second threshold.

9. The method of claim 7, wherein the determination comprises determining the one or more SRS resources are associated with the all different UE antenna ports when the number of the one or more SRS resources is greater than or equal to a first threshold or the number of the one or more SRS ports is equal to or less than a second threshold.

10. The method of claim 7, wherein a bitwidth of an indicator, of the one or more indicators, is based on a number of UE antenna ports and the number of the one or more SRS ports associated with the one or more SRS resources.

11. The method of claim 1, wherein the SRS configuration further configures the UE for SRS precoder switching.

12. The method of claim 5, wherein the determination is based on whether the SRS configuration configures SRS antenna switching, SRS precoder switching, or both.

13. The method of claim 12, wherein the determination comprises:
determining the one or more SRS resources are associated with the at least one same UE antenna port when the SRS configuration configures SRS precoder switching; and
determining a first portion of the one or more SRS resources is associated with the at least one same UE antenna port, a second portion of the SRS resources is associated with another at least one same UE antenna port, and the first portion and the second portion are associated with the all different UE antenna ports when the SRS configuration configures SRS precoder switching, SRS antenna switching, or both.

14. The method of claim 1, wherein the configuring the SRS configuration is via radio resource control (RRC) signaling.

15. The method of claim 14, wherein the set of precoders is provided with the SRS configuration via the RRC signaling.

16. The method of claim 1, further comprising:
configuring the UE with a restricted subset of a set of possible precoders; and
selecting the set of precoders from the restricted subset of the set of possible precoders.

17. The method of claim 1, further comprising triggering the at least one SRS resource set, wherein the triggering comprises triggering the least one SRS resource set via radio resource control (RRC) signaling or a medium access control (MAC) control element (CE) when the at least one SRS resource set is a periodic or semi-persistent SRS resource set, and wherein he triggering comprises triggering the least one SRS resource set via downlink control information (DCI) when the at least one SRS resource set is an aperiodic SRS resource set.

18. The method of claim 17, wherein the set of precoders is provided with the trigger.

19. The method of claim 17, further comprising:
receiving one or more SRS from the UE via the one or more SRS resources of the triggered at least one SRS resource set; and
estimating a downlink channel based on the one or more SRS.

20. A method for wireless communication by a user equipment (UE), the method comprising:
receiving a sounding reference signal (SRS) configuration that configures at least one SRS resource set, the at least one SRS resource set including one or more SRS resources in a first ordered list, each of the one or more SRS resources comprising one or more SRS ports;
receiving a set of precoders via one or more indicators, the set of precoders including a precoder associated with each of the one or more SRS resources, wherein:
a number of precoders in the set of precoders is equal to a number of the one or more SRS resources in the at least one SRS resource set,
receiving the set of precoders comprises receiving the set of precoders in a second ordered list, and
each precoder in the second ordered list is associated with a corresponding SRS resource in the first ordered list; and
determining one or more precoders, of the set of precoders, to apply for one or more SRS transmissions via one or more of the one or more SRS resources.

21. The method of claim 20, further comprising receiving a set of transmission precoding matrix indicators (TPMI) for uplink data, wherein the set of precoders are selected from the set of TPMI.

22. The method of claim 20, wherein each precoder of the set of precoders maps the one or more SRS ports of the associated SRS resource to one or more UE antenna ports.

23. The method of claim 22, wherein each of the one or more UE antenna ports is mapped to one or more transmit antennas of the UE or is mapped to one or more transmit beams of the one or more transmit antennas.

24. The method of claim 22, further comprising determining whether the one or more SRS resources are associated with all different UE antenna ports or are associated with at least one same UE antenna port.

25. The method of claim 24, wherein the determination comprises:
- determining two SRS resources, of the at least one SRS resource set, are associated with the all different UE antenna ports when the precoders, of the set of precoders, provided for the two SRS resources are the same; and
- determining that the two SRS resources, of the at least one SRS resource set, are associated with the at least one same UE antenna port when the precoders, of the set of precoders, provided for the two SRS resources are different.

26. The method of claim 24, wherein the determination is based on a number of the one or more SRS resources of the at least one SRS resource set and based on a number of the one or more SRS ports associated with the one or more SRS resources.

27. An apparatus for wireless communication, the apparatus comprising:
- memory storing computer executable code; and
- at least one processor coupled with the memory and configured to execute the computer executable code and cause the apparatus to:
  - configure a user equipment (UE) with a sounding reference signal (SRS) configuration that configures at least one SRS resource set, the at least one SRS resource set including one or more SRS resources in a first ordered list, each of the one or more SRS resources comprising one or more SRS ports; and
  - provide the UE with a set of precoders via one or more indicators, the set of precoders including a precoder associated with each of the one or more SRS resources, wherein:
    - a number of precoders in the set of precoders is equal to a number of the one or more SRS resources in the at least one SRS resource set,
    - providing the UE with the set of precoders comprises providing the UE with the set of precoders in a second ordered list, and
    - each precoder in the second ordered list is associated with a corresponding SRS resource in the first ordered list.

28. An apparatus for wireless communication, the apparatus comprising:
- memory storing computer executable code; and
- at least one processor coupled with the memory and configured to execute the computer executable code and cause the apparatus to:
  - receive a sounding reference signal (SRS) configuration that configures at least one SRS resource set, the at least one SRS resource set including one or more SRS resources in a first ordered list, each of the one or more SRS resources comprising one or more SRS ports;
  - receive a set of precoders via one or more indicators, the set of precoders including a precoder associated with each of the one or more SRS resources, wherein:
    - a number of precoders in the set of precoders is equal to a number of the one or more SRS resources in the at least one SRS resource set,
    - receiving the set of precoders comprises receiving the set of precoders in a second ordered list, and
    - each precoder in the second ordered list is associated with a corresponding SRS resource in the first ordered list; and
  - determine one or more precoders, of the set of precoders, to apply for one or more SRS transmissions via one or more of the one or more SRS resources.

* * * * *